United States Patent [19]

Abrams et al.

[11] Patent Number: 5,800,757

[45] Date of Patent: *Sep. 1, 1998

[54] SYSTEM AND METHOD FOR MOLDING A BASKETBALL BACKBOARD

[75] Inventors: Fredric Louis Abrams; Robert F. Freund, both of Dayton, Ohio

[73] Assignee: Modern Technologies Corp., Dayton, Ohio

[ * ] Notice: The term of this patent shall not extend beyond the expiration date of Pat. No. 5,591,384.

[21] Appl. No.: 710,411

[22] Filed: Sep. 17, 1996

Related U.S. Application Data

[63] Continuation-in-part of Ser. No. 220,906, Mar. 31, 1994, Pat. No. 5,591,384.

[51] Int. Cl.$^6$ .............................. B29C 43/34; B29C 47/36
[52] U.S. Cl. .......................... 264/132; 264/135; 264/138; 264/142; 264/148; 264/259; 264/275; 264/325
[58] Field of Search .............................. 264/148, 132, 264/142, 325, 40.5, 40.6, 40.7, DIG. 65, DIG. 69, 259, 138, 275, 135; 425/147, 582, 587, 205, 145; 473/481

[56] References Cited

U.S. PATENT DOCUMENTS

| | | |
|---|---|---|
| D. 362,881 | 10/1995 | Schickert et al. . |
| 1,743,299 | 1/1930 | Wiemer . |
| 1,944,464 | 1/1934 | Richardson . |
| 2,386,966 | 10/1945 | MacMillen . |
| 2,683,895 | 7/1954 | Scofield . |
| 2,799,047 | 7/1957 | Widiger et al. . |
| 3,078,513 | 2/1963 | Levison et al. . |
| 3,283,031 | 11/1966 | Sommerfield . |
| 3,453,356 | 7/1969 | Kent et al. . |
| 3,499,186 | 3/1970 | Sassa . |
| 3,574,890 | 4/1971 | Greach . |
| 3,632,254 | 1/1972 | Woodham et al. . |
| 3,728,056 | 4/1973 | Theysohn . |
| 3,767,754 | 10/1973 | Manning et al. . |
| 3,959,209 | 5/1976 | Lake . |
| 4,049,245 | 9/1977 | Tadmore et al. . |
| 4,120,630 | 10/1978 | La Spisa . |
| 4,154,893 | 5/1979 | Goldman ........................ 264/325 |
| 4,197,070 | 4/1980 | Koschmann . |
| 4,267,285 | 5/1981 | Broutman . |
| 4,329,313 | 5/1982 | Miller et al. . |
| 4,393,020 | 7/1983 | Li et al. . |
| 4,402,902 | 9/1983 | Falk et al. . |
| 4,424,968 | 1/1984 | Smith ........................ 273/1.5 R |
| 4,500,595 | 2/1985 | Gerteisen et al. . |
| 4,537,737 | 8/1985 | Crowe . |
| 4,583,732 | 4/1986 | Allen ........................ 273/1.5 R |
| 4,653,646 | 3/1987 | Allen et al. . |
| 4,721,589 | 1/1988 | Harris . |
| 4,738,808 | 4/1988 | Hammer et al. ............... 264/323 |
| 4,804,505 | 2/1989 | Venzke . |
| 4,826,162 | 5/1989 | Allen . |
| 4,863,653 | 9/1989 | Takuba et al. . |
| 4,908,278 | 3/1990 | Bland et al. . |
| 4,921,646 | 5/1990 | Stewart ........................ 264/37 |
| 4,925,381 | 5/1990 | Aoki et al. . |
| 4,937,028 | 6/1990 | Glement et al. . |
| 4,968,463 | 11/1990 | Levasseur . |
| 5,006,007 | 4/1991 | Fischer et al. . |
| 5,088,910 | 2/1992 | Goforth et al. . |
| 5,091,436 | 2/1992 | Frisch et al. ................... 521/137 |
| 5,165,941 | 11/1992 | Hawley . |
| 5,185,117 | 2/1993 | Hawley . |
| 5,207,407 | 5/1993 | Fitzsimmons . |
| 5,238,663 | 8/1993 | Jameson ..................... 264/211.23 |
| 5,240,663 | 8/1993 | Stringaro et al. . |

(List continued on next page.)

FOREIGN PATENT DOCUMENTS 1646880  5/1991  U.S.S.R. .

Primary Examiner—Jan H. Silbaugh
Assistant Examiner—Mark Eashoo
Attorney, Agent, or Firm—Jacox, Meckstroth & Jenkins

[57] ABSTRACT

A system and method are disclosed for molding a part, such as a point-of-purchase display, is shown. The system includes a plasticator and press. The molded part comprises an in-molded graphics sheet which becomes molded integral with the part.

46 Claims, 21 Drawing Sheets

U.S. PATENT DOCUMENTS

| | | |
|---|---|---|
| 5,275,776 | 1/1994 | Hara et al. . |
| 5,292,118 | 3/1994 | Allen et al. . |
| 5,312,573 | 5/1994 | Rosenbaum et al. ............ 264/37 |
| 5,324,755 | 6/1994 | Kilius et al. . |
| 5,358,397 | 10/1994 | Ligon et al. . |
| 5,358,680 | 10/1994 | Boissonnat et al. . |
| 5,415,393 | 5/1995 | Fitzsimmons . |
| 5,421,712 | 6/1995 | Laing et al. . |
| 5,507,484 | 4/1996 | Van Nimwegen et al. ......... 273/1.5 R |
| 5,524,883 | 6/1996 | Allen et al. ............... 273/1.5 R |
| 5,591,384 | 1/1997 | Abrams et al. ................ 264/40.5 |
| 5,626,339 | 5/1997 | Schickert et al. ................ 473/481 |
| 5,637,329 | 6/1997 | Abrams et al. ................ 264/142 |

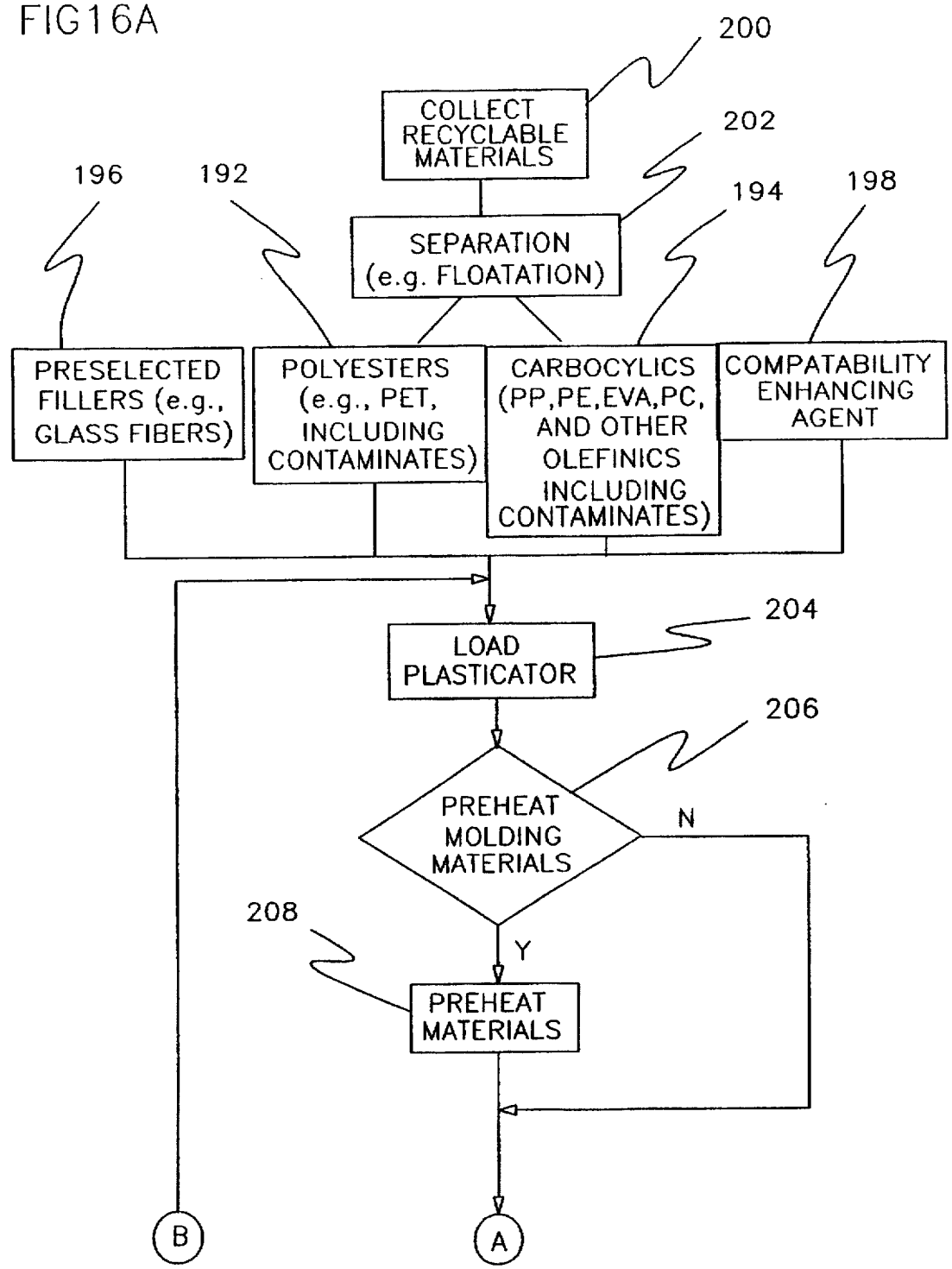

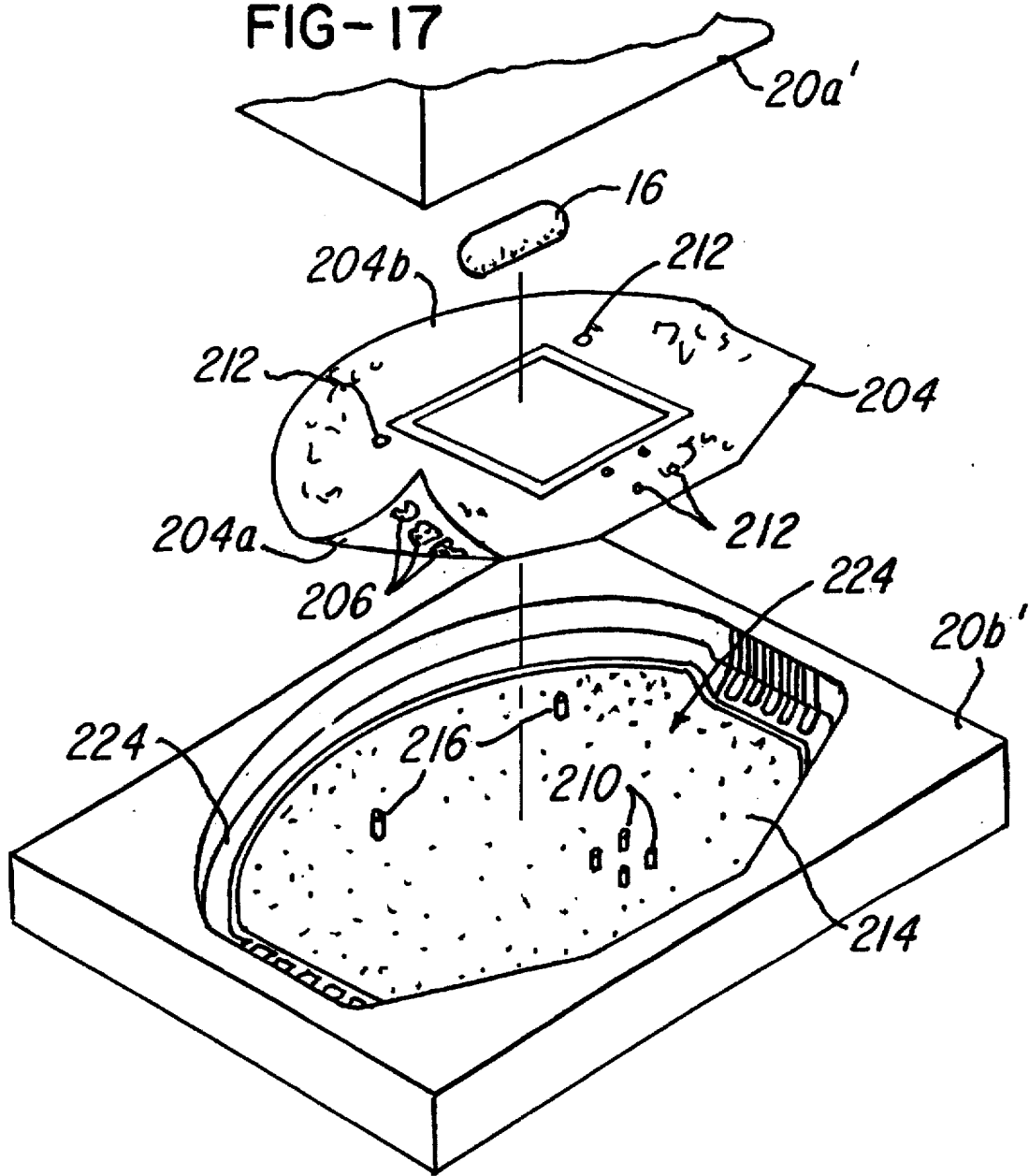

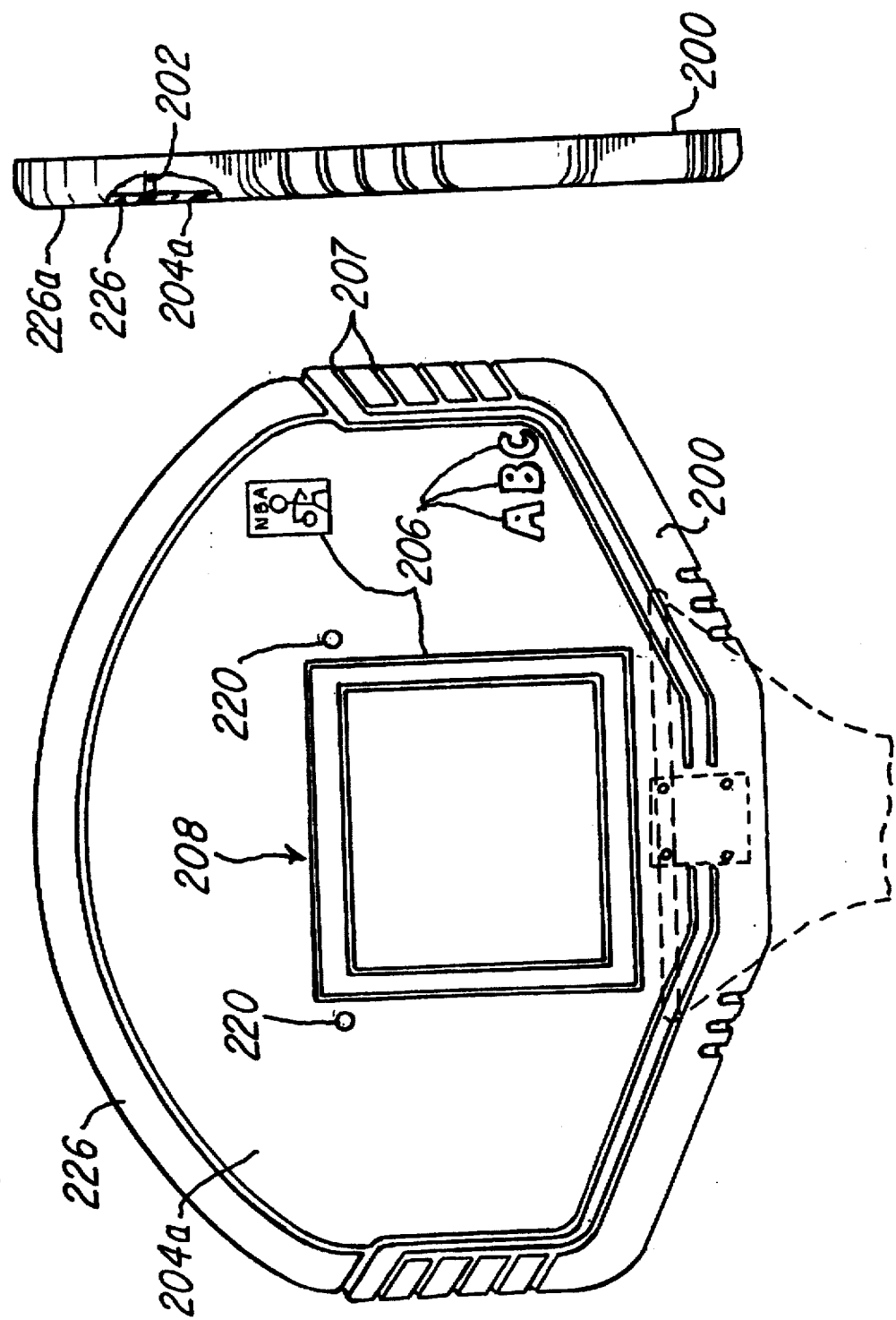

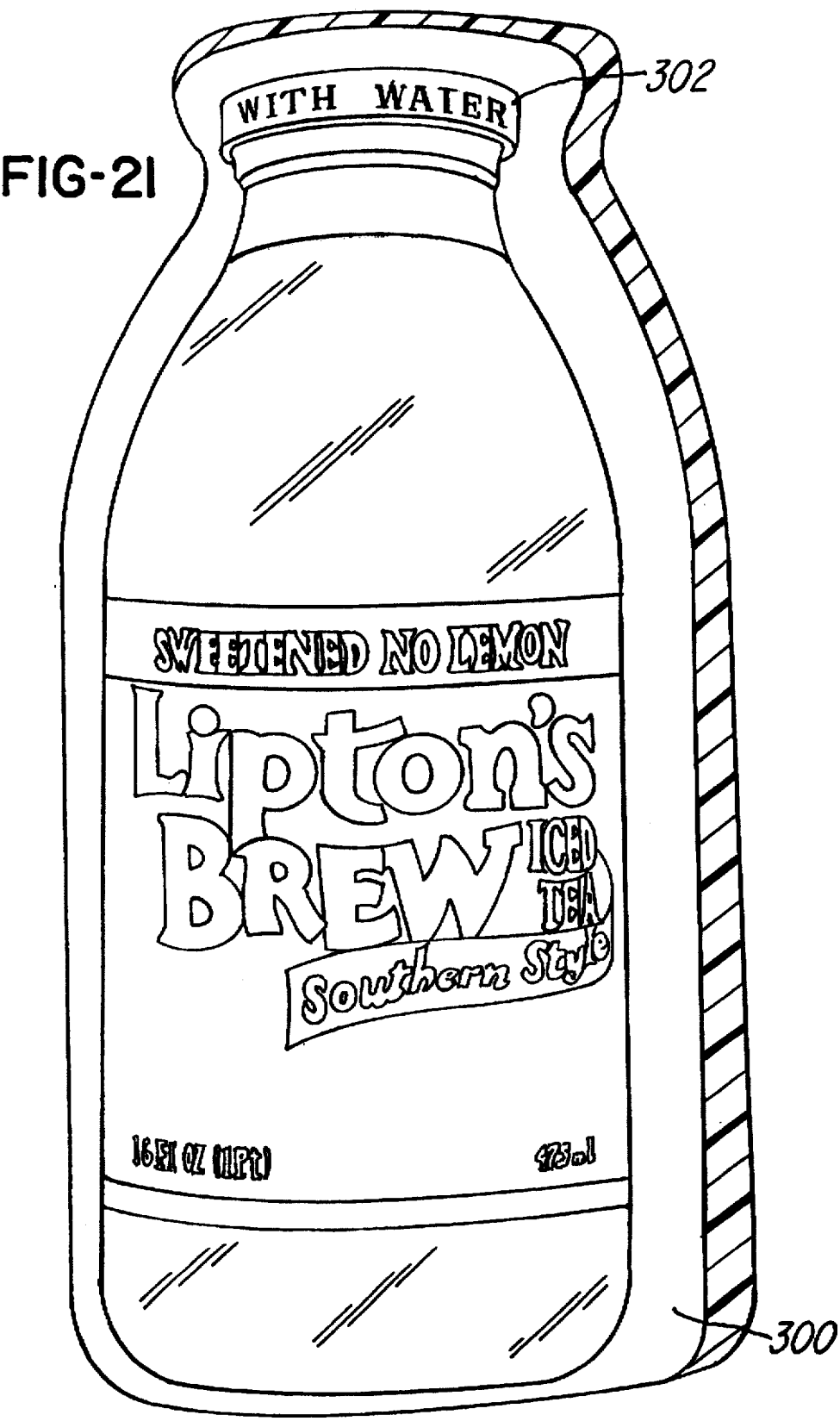

SYSTEM AND METHOD FOR MOLDING A BASKETBALL BACKBOARD

RELATED APPLICATION

This application is a continuation-in-part of application Ser. No. 08/220,906 filed Mar. 31, 1994 now issued as U.S. Pat. No. 5,591,384.

BACKGROUND OF THE INVENTION

1. Field of the Invention

This invention relates to a system and method for molding parts, and more particularly, a system and method for molding parts from contaminated molding materials using a single thermal heat rise.

2. Description of Related Art

In the field of thermoplastic molding, it is common to mold parts using either an injection or compression molding process. Due to the size of the orifices used in the injection molding equipment, it is often difficult to injection mold with reinforcing fibers, such as glass fibers, having a length over one-eighth inch because such fibers are not easily injected into or conveyed through the injection mold equipment. In addition, it is difficult to use contaminated molding materials such as those collected in plastics recycling programs unless they have been substantially cleaned, processed and put into a usable form and size prior to being used in the injection molding equipment. Such cleaning and processing are expensive and can substantially increase the cost of using the contaminated materials, thereby making them economically impractical.

Another problem with the thermoplastic processes of the past is that the thermoplastics become degraded and lose, for example, their strength when exposed to multiple heat rises.

In general, there are two basic types of compression molding processes which may be used for molding thermoplastics. First, a sheet molding process involves placing a reinforcement, such as a glass mat, between sandwiching layers of a thermoplastic and heating the materials to produce a single sheet of material. The single sheet of material is then cut to the desired size and then reheated to molding temperature before being placed in a compression molding press. This process has the disadvantage of higher cost because of the apparatus required, the material handling costs incurred in making the sheet, handling and cutting the sheet, and the like. The material used to make the sheet is also subject to three thermodynamic cycles, a first cycle when the thermoplastic sheet is formed, a second cycle when the thermoplastic sheets and glass mat are molded together, and a third cycle when the resulting sheet is heated to molten temperature prior to molding the part.

The second form of thermoplastic compression is bulk molding compounds by producing a billet of molten material that is placed into a compression molding press which molds the molten material into a part. Effectively placing and distributing long reinforcing fibers in the billet has heretofore required complex machinery. For example, U.S. Pat. No. 5,165,941 issued to Ronald C. Hawley on Nov. 24, 1992, discloses an extruder apparatus and process for compounding thermoplastic resin and fibers. The Hawley extruder includes an apparatus for compounding thermoplastic resin and reinforcing fibers incorporating a resin extruder in which thermoplastic resin pellets are melted in a second, compounding, extruder in which the molten thermoplastic resin is mixed in intimate contact with long reinforcing fibers. The melted thermoplastic resin is not fed into the device with the fibers, but rather is introduced into the compounding extruder at a point downstream of the inlet point for reinforcing fibers, so that the fibers are mechanically worked and heated before coming into contact with heated, molten thermoplastic resins.

The Hawley device generally suffers from complexity that raises the investment and maintenance costs.

The compression molding of products using polymeric material and glass fibers has traditionally produced a material referred to as fiber glass reinforced plastic. This material exhibits characteristics better than the reinforced plastics, but does not exhibit strength, elasticity or impact resistance comparable to thermoplastic materials which are specifically designed to exhibit these characteristics. Most fiberglass reinforced plastic currently in the market is thermoset and is essentially a solidified mixture of fiber glass and plastic without benefit of chemical bonding or specific methods of enhancing polymer entrapment of the glass fibers because the glass fibers are merely immobilized in the resin in which it is embodied.

In addition, thermoset materials are generally not recyclable other than as filler materials, while thermoplastic materials can be remelted and remolded.

In the field of molded parts, many products are currently made from a variety of materials using moldable plastic. In the sporting goods field for example, bicycles, basketball backboards, toy vehicles and the like are commonly produced using multiple plastic materials. Compression molding has been a common method for producing basketball backboards and related parts of basketball goal assemblies, such as the support pull for the basketball backboard for many years. Heretofore, compression molding of basketball backboards and related parts has typically been limited to thermoset materials, which is characterized by placement of a cold charge in a compression mold. Thermoset process materials have certain drawbacks, including the fact that these material are generally not recyclable other than as filler materials. In general, there are two basic types of compression molding processes which may be used for molding thermoplastics. The following description of these two processes outline some of the difficulties that have prevented use of compression molding thermoplastics in the basketball goal assembly field.

The first type is a sheet molding process that involves a reinforcement, such as a glass mat, between sandwiching layers of a thermoplastic and heating the materials to produce a single sheet of material. The single sheet of material is then cut to the desired size and then reheated to molding temperature before being placed in a compression molding press. This process has the disadvantage of higher cost because of the apparatus required, the material handling cost incurred in making the sheet, handling and cutting the sheet, and the like. The material used to make the sheet is also subject to three thermodynamic cycles, a first cycle when the thermoplastic sheet is formed, a second cycle when the thermoplastic sheets and glass mat are molded together, and a third cycle when the resulting sheet is heated to molted temperature before molding the part.

A second form of thermoplastic compression is bulk molding compounds by producing a billet of molten material that is placed into a compression molding press which molds the molten material into a part. Effectively, placing and distributing long reinforcing fibers in the billet has heretofore required complex machinery as discussed in detail in parent application Ser. No. 08/220,906, now issued as U.S. Pat. No. 5,591,384.

In addition, in recent years it has been increasingly common to provide graphics on the front face of molded parts, including the backboard, for a variety of reasons, such as aesthetic appeal to the consumer, product and source identification, and the like. However, the only commercially acceptable method of applying graphics have been silk-screened with inks or by applying decals.

Silk-screening is time consuming and tends to fade after prolonged exposure to sunlight and the elements. Decals are also expensive and can peel off after time.

An example of a prior art basketball backboard with silk-screen graphics is a backboard sold as "ShurShot". The silk-screen ShurShot backboard is believed to be about 48 inches across and mates a structurally foam polystyrene molded in a multiple-port injection process. The backboard is molded in the natural color of polystyrene, which is milky white. The entire ShurShot backboard is subsequently spray painted both to seal the polystyrene and to protect the backboard from ultraviolet radiation. Finally, graphics are silk-screened on the front face of the backboard.

In some prior art applications, a graphics display was printed on a styrene sheet and laid by hand into a mold for forming the backboard. Alignment of the sheet was accomplished by aligning holes in the sheet on pins in the mold provided for producing the mounting holes in the backboard. Upon injecting styrene into the mold, the back portion of the graphics sheet melted to cause it to be joined to the face of the backboard. As styrene is relatively easy to print on, its use in this prior art process was conducive to the production of backboards provided with sheets having graphics printed thereon.

One of the problems encountered with printing on parts or backboards molded using the system of the parent application Ser. No. 08/220,906, now issued as U.S. Pat. No. 5,591,384, was that printing on polyolefin materials was difficult because the polyolefin-based materials were relatively non-porous and, therefore, not receptive to printing inks.

What is needed, therefore, is an apparatus and method for molding thermoplastic parts which is simple and economical and which preserves the length of the reinforcing fibers, evenly distributes the reinforcing fibers or any other filler materials while maintaining flexibility of the material type in products fabricated, is capable of capitalizing on use of various contaminated thermoplastics to allow use of post consumer recycled material, and which provides a compounding and fabrication environment which promotes chemical bonding and molecular orientation to enhance the characteristics of the molded part.

The foregoing also demonstrates the need for a compression molding apparatus and method for making parts, such as sporting goods equipment including basketball backboards from recycled thermoplastic materials without requiring the extensive cleaning and processing that heretofore has made use of thermoplastics for these products in practical. There is also a need to improve the in-mold graphics process to permit the basketball backboard and other plastic molded parts of basketball goal assemblies to be compression molded with thermoplastic resin materials having improved in-molded graphics.

SUMMARY OF THE INVENTION

It is therefore a primary object of this invention to provide a method and apparatus which facilitates overcoming one or more of the aforementioned problems.

In one aspect of the invention, this invention comprises a plasticator for creating a billet of moldable material including a feeder for receiving a plurality of molding materials comprising a predetermined amount of a polyester, other carbocyclic and reinforcing fibers and a suspender coupled to said feeder for receiving the molding materials, for creating a molten suspension of the molding materials without damaging a substantial number of the reinforcing fibers, and also for creating the billet.

In one aspect of the invention, this invention comprises a plasticator for creating a billet of moldable material including a feeder for receiving a plurality of molding materials comprising a predetermined amount of a polyester, other carbocylics and reinforcing fibers, and a suspender coupled to the feeder for receiving the molding materials, for creating a molten suspension of the molding materials without damaging a substantial number of the reinforcing fibers, and also for creating the billet.

In another aspect of the invention, this invention comprises a method for creating a billet for molding a part comprising the steps of (a) loading a plasticator with molding materials, the molding materials comprising a polyester, other carbocylics and reinforcing fibers, (b) heating the molding materials to a predetermined temperature, (c) blending the molding materials in order to create a molten suspension wherein a majority of the reinforcing fibers remain generally undamaged, and (d) extruding the molten suspension in order to form a billet having preselected billet characteristics.

In yet another aspect, this invention comprises a plasticator for creating a billet from a plurality of molding materials, the plasticator comprising plasticating means for receiving the molding materials and for creating a molten suspension of the molding materials, and control means associated with the plasticating means for controlling the suspension characteristics applied to the molding materials in order to plasticity the plurality of molding materials into a billet having predetermined billet characteristics.

In still another aspect, this invention comprises a system for molding a part comprising a plasticator for creating a billet from a plurality of molding materials, the plasticator comprising plasticating means for receiving the molding materials and for creating a molten suspension of the molding materials, control means associated with the plasticating means for controlling the suspension characteristics applied to the molding materials in order to plasticity the plurality of molding materials into a billet having predetermined billet characteristics, and a press having a mold for receiving the billet and for molding the billet into the part.

In yet another aspect, this invention comprises a plasticating process comprising the steps of loading a plasticator with a plurality of molding materials, creating a mixture with the plurality of molding materials in the plasticator, and plasticating the mixture of the plurality of molding materials at a controlled temperature and pressure in order to create a billet having predetermined billet characteristics.

In a still further aspect, the invention comprises a screw for use in a plasticator having a barrel, the screw comprising a root and a plurality of threads configured to permit a polyester, other carbocylics and a plurality of reinforcing fibers to be mixed to provide a billet having predetermined billet characteristics without damaging a substantial number of the reinforcing fibers.

It is an object of this invention to provide a system and method for using long reinforcing fibers that can be loaded simultaneously along with the thermoplastics being used.

Another object is to facilitate providing a system and method which is simple and economical and which provides a process that generally preserves the length of the reinforcing fibers through the plasticating and molding process.

Another object of this invention is to provide a method and apparatus which evenly distributes any filler materials, such as reinforcing fibers, which are used in the apparatus and method.

Still another object of the invention is to provide a method and apparatus which facilitates using contaminated molding materials which have heretofore been undesirable for use because of their contamination or because they are expensive to clean sufficiently for use.

Still another object of this invention is to provide a method and apparatus which facilitates or enhances chemical bonding and molecular orientation of the polymer molding materials being used.

Yet another object is to provide a system and method for efficiently and effectively in-molding graphics into a part such as a basketball backboard or other sporting equipment.

In a still further aspect of the invention this invention comprises a plasticating process comprising the steps of loading a plasticator with a plurality of molding materials, creating a mixture with the plurality of molding materials in the plasticator, and plasticating the mixture of said plurality of molding materials at a controlled temperature and pressure in order to create a billet having predetermined billet characteristics.

In another aspect of the invention a process for molding a part comprises the steps of placing a sheet into a mold prior to molding, placing a billet onto the sheet, compression molding the sheet and the billet to produce a part such that the sheet becomes integrally molded with the part.

In another aspect of the invention a molded part comprising a compression molded part molded from a plurality of materials comprising a predetermined amount of a reinforcing fiber and thermoplastic polymers, a sheet integrally molded into said part, the sheet comprising a graphics side facing away from the part.

In still another aspect of the invention a basketball backboard comprising a backboard member molded from a plurality of materials comprising a predetermined amount of a reinforcing fiber and thermoplastic polymers, and a sheet integrally molded into the backboard member, the sheet comprising a graphics side facing away from the part.

These objects and others will be more apparent when the following description is read in conjunction with the claims and drawings.

BRIEF DESCRIPTION OF THE DRAWINGS

FIGS. 16a and 16b, taken together, are schematic diagrams showing a process according to an embodiment of the invention.

FIG. 17 is an exploded view illustrating a mold for manufacturing a basketball backboard;

FIG. 18 is a front view of the basketball backboard manufactured in accordance with the mold shown in FIG. 17;

FIG. 19 is a fragmentary side view of the basketball backboard shown in FIG. 18;

FIG. 21 is a view of a point-of-purchase display manufactured in accordance with an aspect of this invention.

DETAILED DESCRIPTION OF A PREFERRED EMBODIMENT

Figure 1:
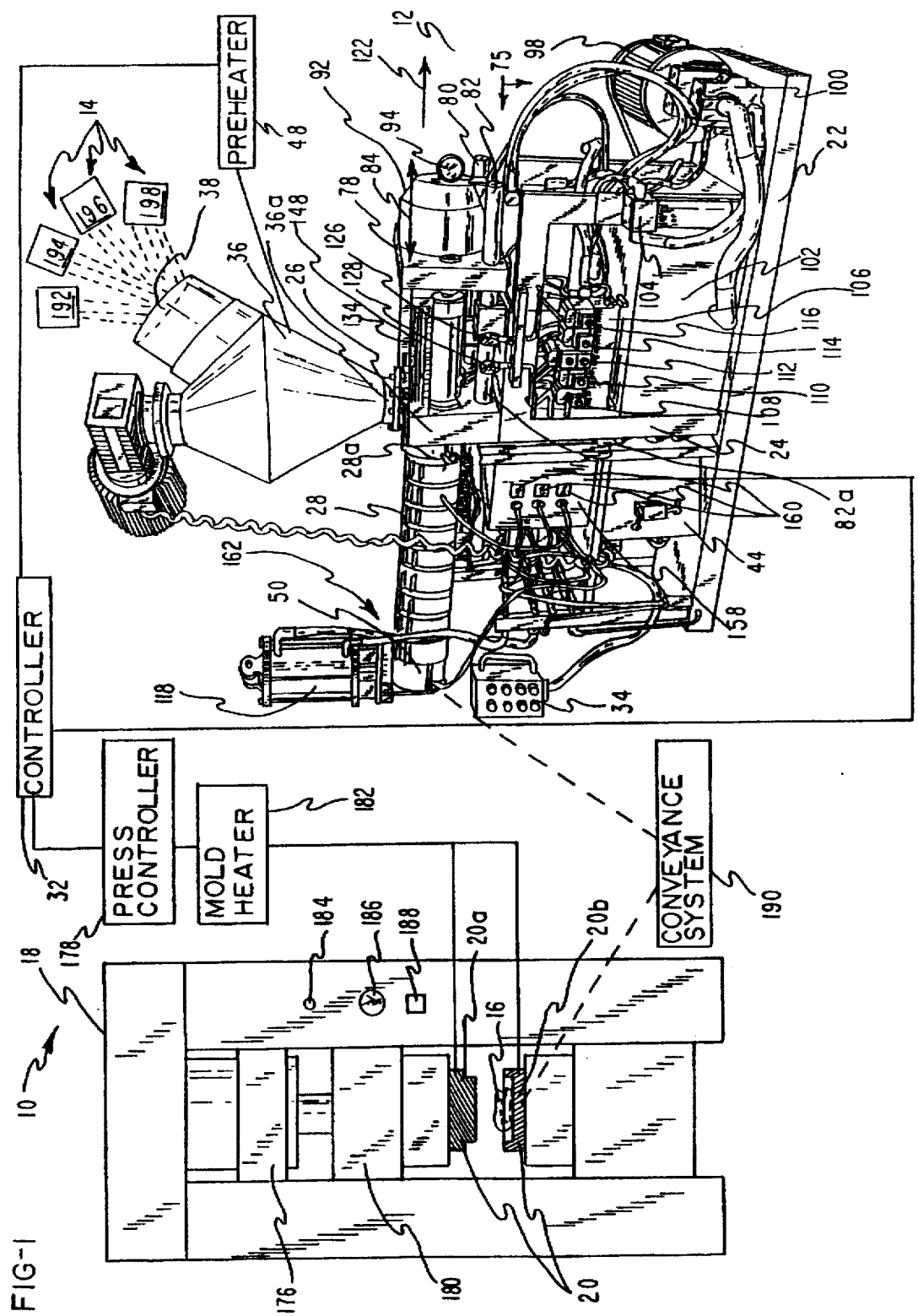
FIG. 1 is a view of a system according to one embodiment of the invention, comprising a plasticator and a press.

Referring now to FIG. 1, a system 10 for molding a part is shown. The system 10 comprises a plasticator 12 for receiving a plurality of molding materials 14 and also for plasticating the molding materials 14 into a billet 16. The system 10 also comprises a press 18 associated with the plasticator 12 for receiving the billet 16 and for molding the billet 16 into the part (not shown) defined by a mold 20.

The plasticator 12 comprises a base 22 which supports the various components of the plasticator 12. The base 22 has a support column 24 which supports a stationery block 26. The plasticator 12 comprises a suspender or barrel 28 having a feeding end 28a mounted to the stationery block 26. The plasticator 12 also comprises a screw 30 (FIG. 3) which is rotatable and axially mounted in barrel 28 as described below.

The system 10 comprises a controller/microprocessor 32 for controlling the operation of the plasticator 12 and press 18. The controller 32 includes an operator control box 34 for interfacing with controller 32. A suitable controller is the Model Slick 150 manufactured by Allen Bradley of Fairfield, N.J., but it should be understood that any suitable controller which is capable of controlling the operation of the system may be used.

As best illustrated in FIG. 1, the plasticator 12 further comprises feeding means or a feed hopper 36 having an opening 38 for receiving the molding materials 14. The feed hopper opening 38 may be directly connected to a supply system (not shown) for moving materials from a storage or drying area (not shown) to the system 10. The feed hopper 36 may include an agitator 40 (FIG. 2) for facilitating agitating and mixing the molding materials 14. The agitator 40 is coupled to a drive motor 42 which in turn is coupled to a control box 44 which controls the speed and operation of the drive motor 42. In one embodiment, the control box 44 is coupled to controller 32, thereby permitting the controller 32 to control the operation of the drive motor 42. The drive motor is an electric drive motor, but it could be any suitable type of motor for driving the agitator, such as a hydraulic or pneumatic motor.

The feed hopper 36 has an end 36a coupled to stationery block 26 so that the molding materials 14 may be fed into a feeding opening 46 (FIG. 3) in the feeding end 28a of barrel 28.

The feeding means or feed hopper 36 may comprise a preheater 48 (FIG. 1) which is coupled to controller 32 for preheating the molding materials 14 to a preheated temperature before the molding materials 14 are introduced into the feeding opening 46 in barrel 28. In the embodiment being described, the preheater 48 may preheat the molding materials 14 in feed hopper 36 to between 100 and 300 degrees Fahrenheit, depending on the molding materials 14 selected and used. Although not shown, the feed hopper 36 may be insulated to facilitate maintaining the temperature in the feed hopper at the preheated temperature.

The suspender or barrel 28 has a feeding end 28a and also an extruding end 28b from which billet 16 is extruded. In one embodiment, the barrel 28 is approximately four feet long and has an outside diameter of approximately eight inches and an inside diameter of approximately four inches. The barrel 28 is manufactured from hardened steel and weighs approximately 300 pounds. The barrel may have a die 50 located at the extruding end 28b. The function of the die 50 is to cause the billet 16 to be extruded into a predetermined shape or diameter. For example, the billet 16 may be extruded so that its cross-sectional diameter is approximately 2.0 inches.

As illustrated in FIGS. 3-10, the barrel 28 comprises a feeding portion 54, a blending portion 56 and an extruding portion 58. The plasticator 12 also comprises the screw 30 which is rotatively and axially mounted in a passageway 52 defined by barrel 28. Notice that screw 30 comprises a feeding end 30a and an extruding end 30b. The screw 30 further comprises a feeding section 60 associated with the feeding end 30a, a blending section 62, and an extruding section 64 associated with extruding end 28b. The feeding section 60, blending section 62 and extruding section 64 of screw 30 become generally associated with the feeding portion 54, blending portion 56 and extruding portion 58, respectively, of barrel 28 when the screw 30 is located in a home position generally shown in FIGS. 3-5.

The feeding section 60 comprises a first plurality of threads 66. The blending section 62 comprises a second plurality of threads 68, and the extruding section 64 comprises a third plurality of threads 70.

Figure 2:
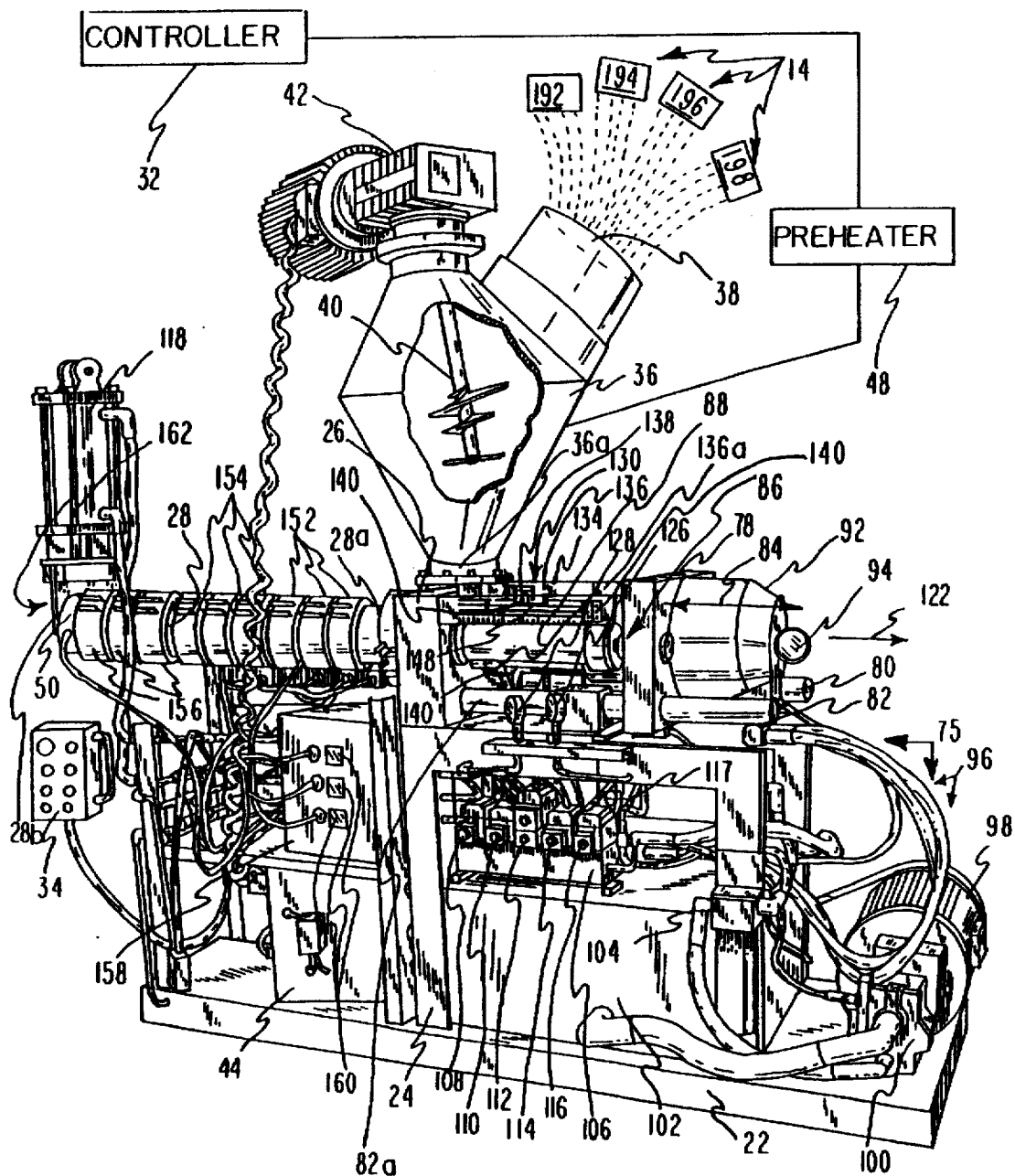
FIG. 2 is a fragmentary view of the plasticator shown in FIG. 1.
Figure 3:
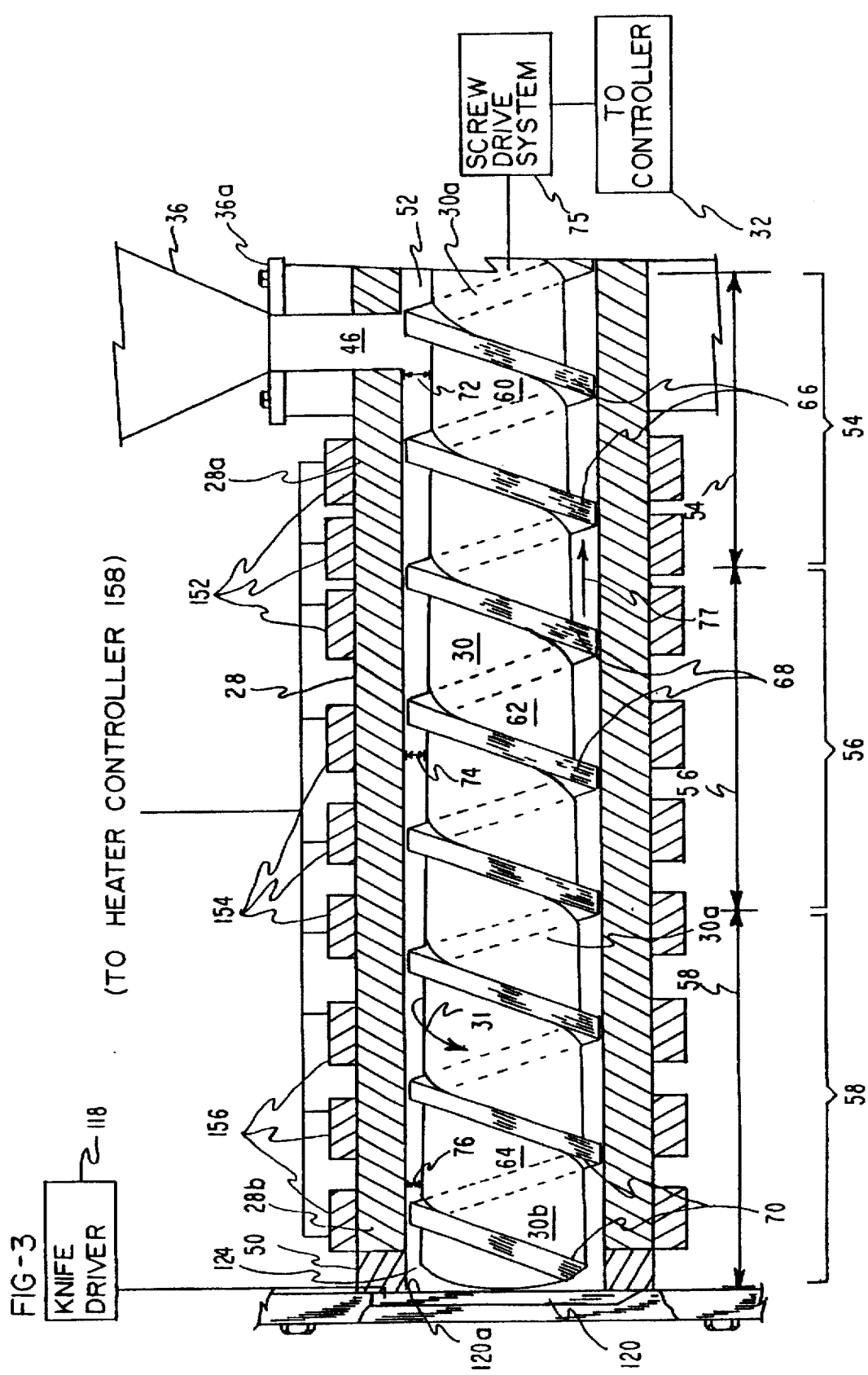
FIG. 3 is a fragmentary sectional view showing a screw positioned in a barrel which may be used in the plasticator shown in FIGS. 1 and 2.

As illustrated in FIG. 3, the first plurality of threads 66 have a depth, identified by double arrow 72, which is generally greater than the depth, identified by double arrow 74, of the second plurality of threads 68 associated with the blending section 62 of screw 30. The first and second plurality of threads 66 and 68 may have a depth which is greater than the depth 76 of the third plurality of threads 70 associated with extruding section 64. It is to be noted that screw 30 comprises a shaft or a root or core 30d about which the first, second and third plurality of threads 66, 68 and 70 are located. As best illustrated in FIGS. 2 and 3, the core 30d may be generally tapered to provide a screw depth that generally decreases from the feeding end 30a to the extruding end 30b. This facilitates ensuring that the depth 72 of the first plurality of threads 66 is generally greater than the depth 74 of the third plurality of threads 70.

Figure 4:
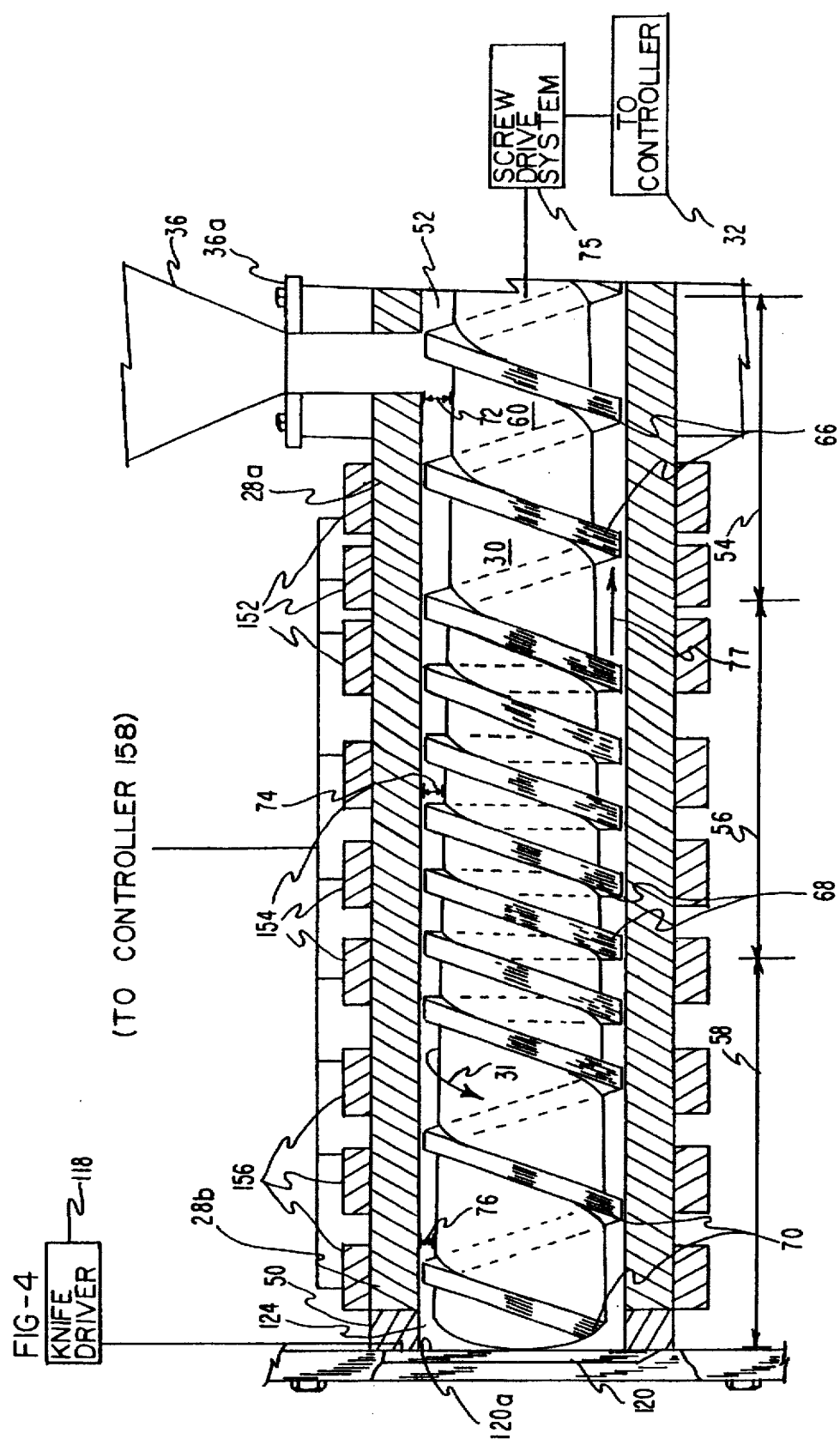
FIG. 4 is a view similar to FIG. 3 showing a screw having a plurality of pitch diameters or distances.

Another embodiment of the screw 30 is shown in FIG. 4. In this embodiment, the second plurality of threads 68 are provided with a greater number of threads (i. e., a smaller pitch or distance between threads) than the first plurality of threads 66. The embodiments shown in FIGS. 3 and 4 facilitate controlling the mixture and suspension time of the molding materials 14 and, further, mixing the molding materials 14 with a predetermined pressure and shear, without significantly damaging the molding materials 14 as the screw 30 rotates.

In one embodiment the screw 30 is approximately 100 inches long and has a core 30d diameter of approximately 3.7 inches. The screw 30 is a left-hand screw, and the depths 72, 74 and 76 are 0.8 inch, 0.6 inch, and 0.75 inch, respectively. The blending section 62 of screw 30 has about 30% more turns in FIG. 4 when compared to the feeding section 60.

The plasticator 12 also comprises means for driving screw 30 or a screw drive system 75 for rotatably and axially driving the screw 30 in a passageway 52 (FIG. 3) of barrel 28. The screw drive system 75 is capable of controlling the rotational and axial movement of screw 30 in the barrel 28 in order to facilitate mixing the molding materials 14 into a molten suspension and ultimately, into billet 16 having certain predetermined characteristics. When the mixed molten suspension achieves the predetermined characteristics, such as a predetermined volume, density, viscosity, or size as indicated by predetermined temperature and pressure, then screw 30 is allowed to withdraw in the direction of arrow 77 in FIG. 3 to permit the suspension to be formed into the billet 16 at a storage or extruding area 124 of barrel 28. As described below, the screw drive system 75 is also capable of controlling the rotational speed of screw 30 and the axial movement of screw 30 until the desired predetermined characteristics are achieved.

The screw drive system 75 (FIG. 2) comprises means coupled to screw 30 for rotatably driving screw 30 and also for axially driving screw 30 into and out of passageway 52 (FIG. 2) in barrel 28. The means comprises a slidable block 78 which is slidably mounted on a pair of stationary column supports 80 and 82, each having an end (such as 92a) secured to stationary block 26. The means also comprises suitable bearings (not shown) located in slidable block 78 for facilitating the axial movement of slidable block 78 in the direction of double arrow 84 in FIG. 2.

Figure 11:
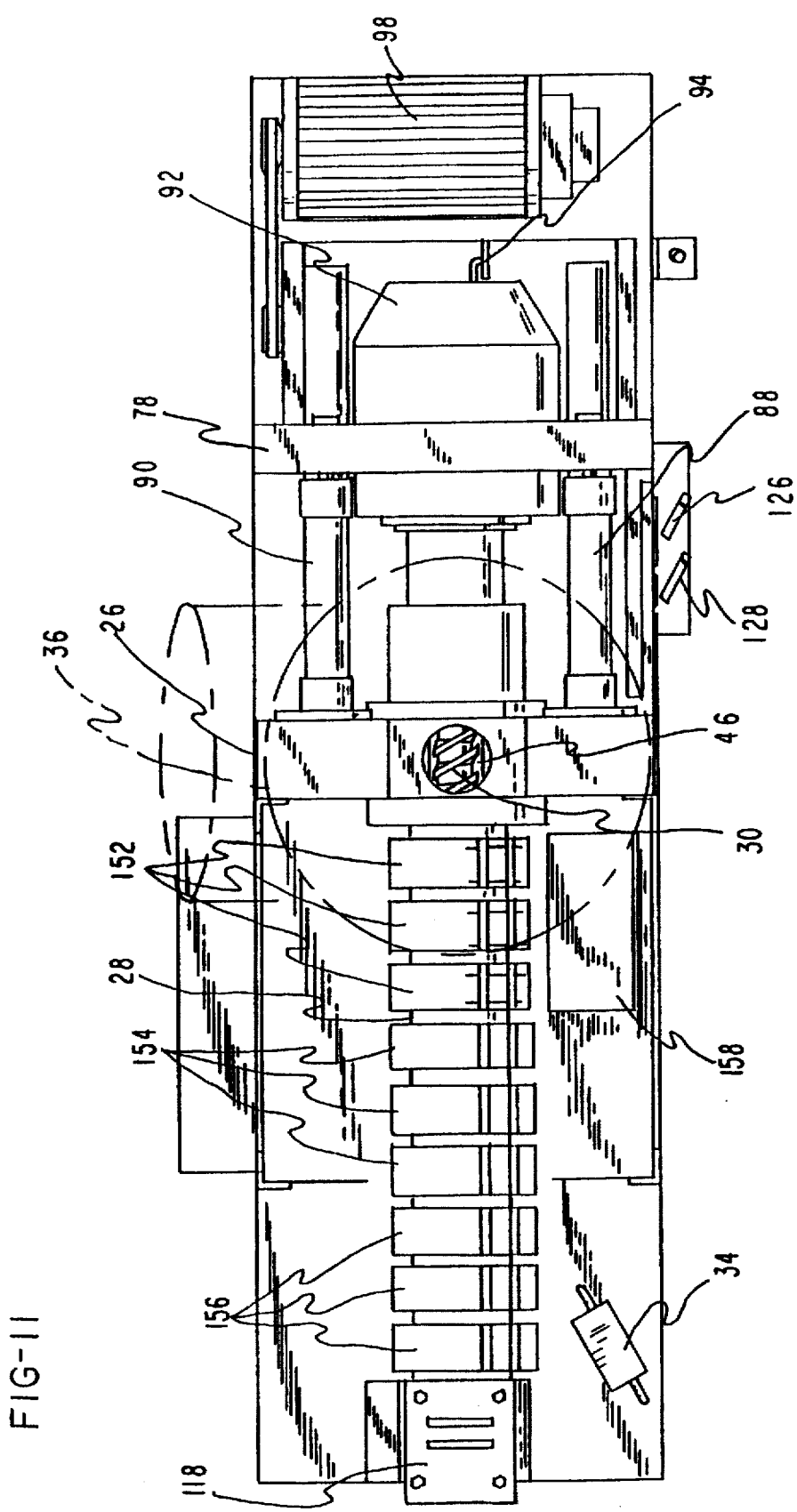
FIG. 11 is a top view showing a screw drive system in a home position.
Figure 12:
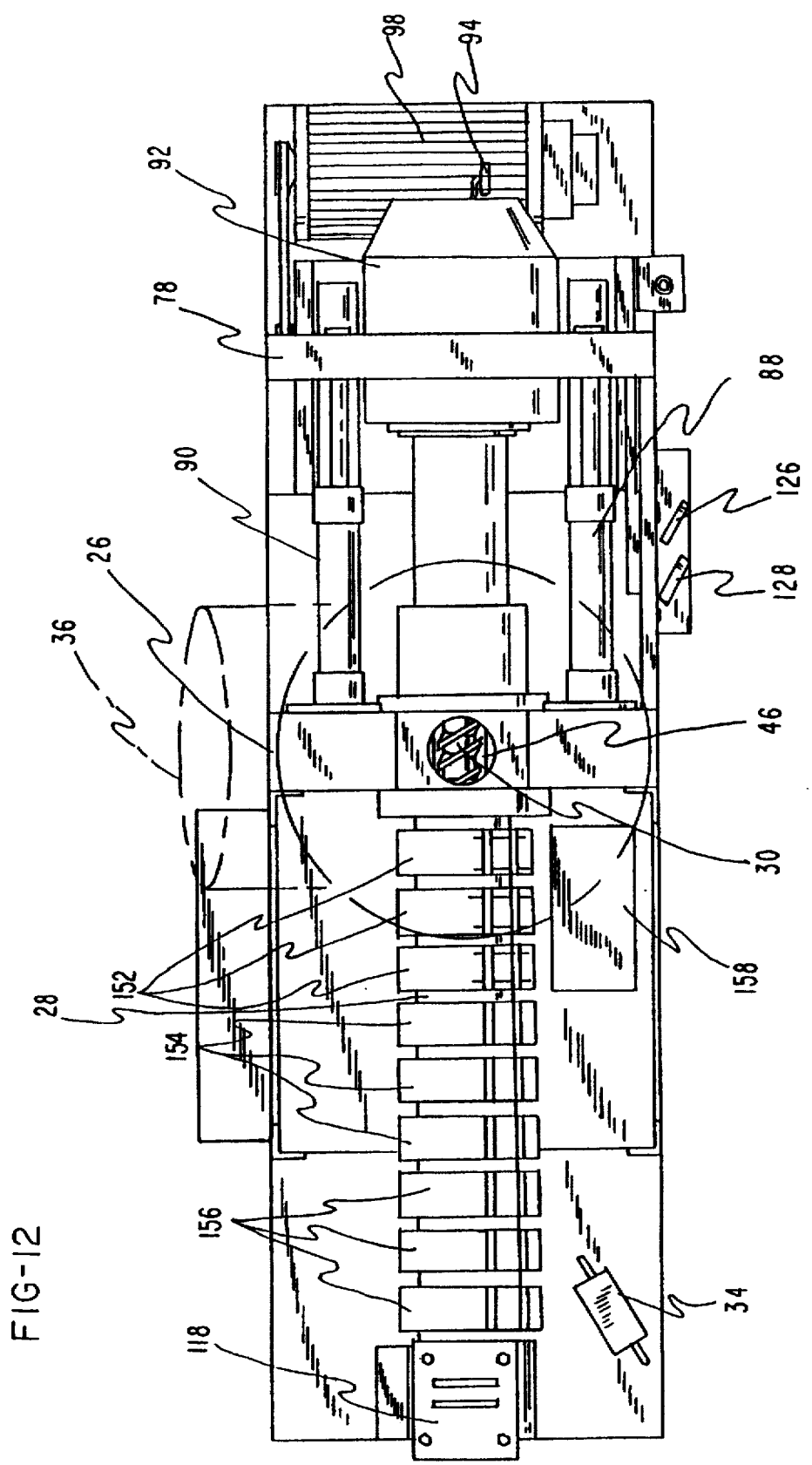
FIG. 12 is a view similar to FIG. 11 showing the screw drive system withdrawing the screw from the barrel.
Figure 13:
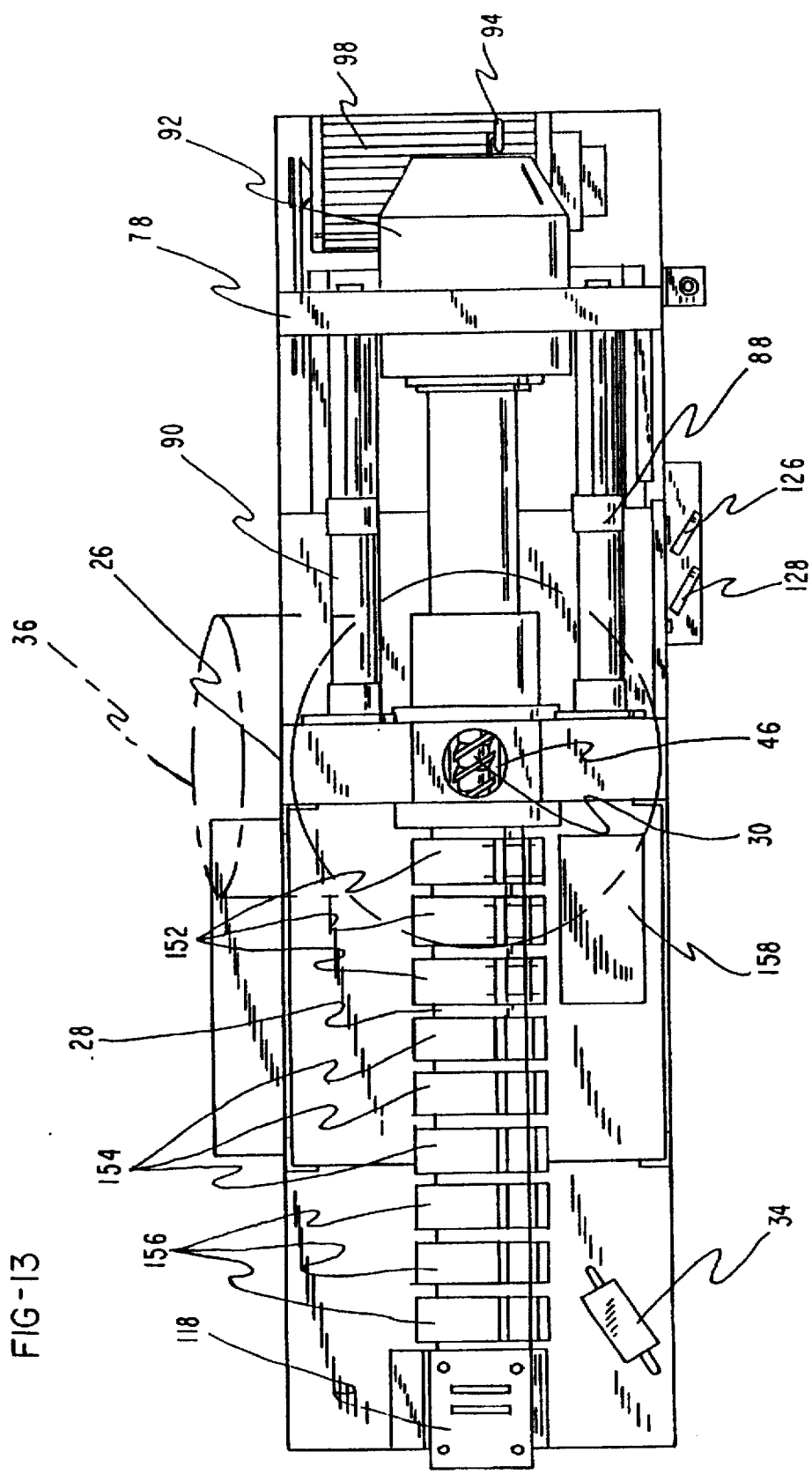
FIG. 13 is another view showing the screw drive system after it has withdrawn the screw further from the barrel.

The screw drive system 75 also comprises a block driver 86 for slidably driving the slidable block 78 in the direction of double arrow 84. In the embodiment being described, the block driver 86 comprises a pair of push/pull hydraulic cylinders 88 and 90 (FIGS. 11-13). The screw drive system 75 also comprises a drive motor 92 which is coupled to screw 30 and which rotatably drives screw 30 in either a clockwise or counterclockwise direction as desired. In the embodiment being described, the drive motor 92 is a hydraulic motor which is capable of rotating screw 30 at approximately 0 to 100 rpms.

The screw drive system 75 may comprise first sensing means or sensor 94 for sensing the rpms of drive motor 92. First sensing means 94 may also include a torque sensor (not shown) which is coupled to controller 32 and which monitors or senses the torque of screw 30 as it produces the billet 16.

The plasticator 12 comprises power means or a power system 96 for energizing drive motor 92 and block driver 86. In the embodiment being described, the power system 96 comprises an electric motor 98 which drives a hydraulic pump 100. The hydraulic pump 100 pumps oil from a reservoir 102 through filter 104 into control means or control block 106. The control block 106 comprises pressure valves 108, 110, 112, 114 and 116 which control the delivery of fluid to cylinders 88, 90, drive motor 92 and to a knife driver 118 as described below. The pressure valves 108, 110, 112, 114 and 116 are coupled to controller 32 which is capable of controlling their operation as described below.

The power system 96 may comprise a plurality of variable pressure regulators, such as regulator 117, which may be positioned between the drive motor 92, cylinders 88 and 90 and their respective pressure valves in order to facilitate controlling the hydraulic pressure delivered thereto. For example, the pressure regulator associated with the cylinders 88 and 90 can be adjusted so that the pressure delivered to cylinders 88 and 90 can be varied. One suitable pressure regulator is the Vickers regulator, manufactured by Vickers of Troy, Mich. This permits an operator to vary the amount of pressure at which the slidable block 78 is biased towards the stationary block 26.

Figure 5:
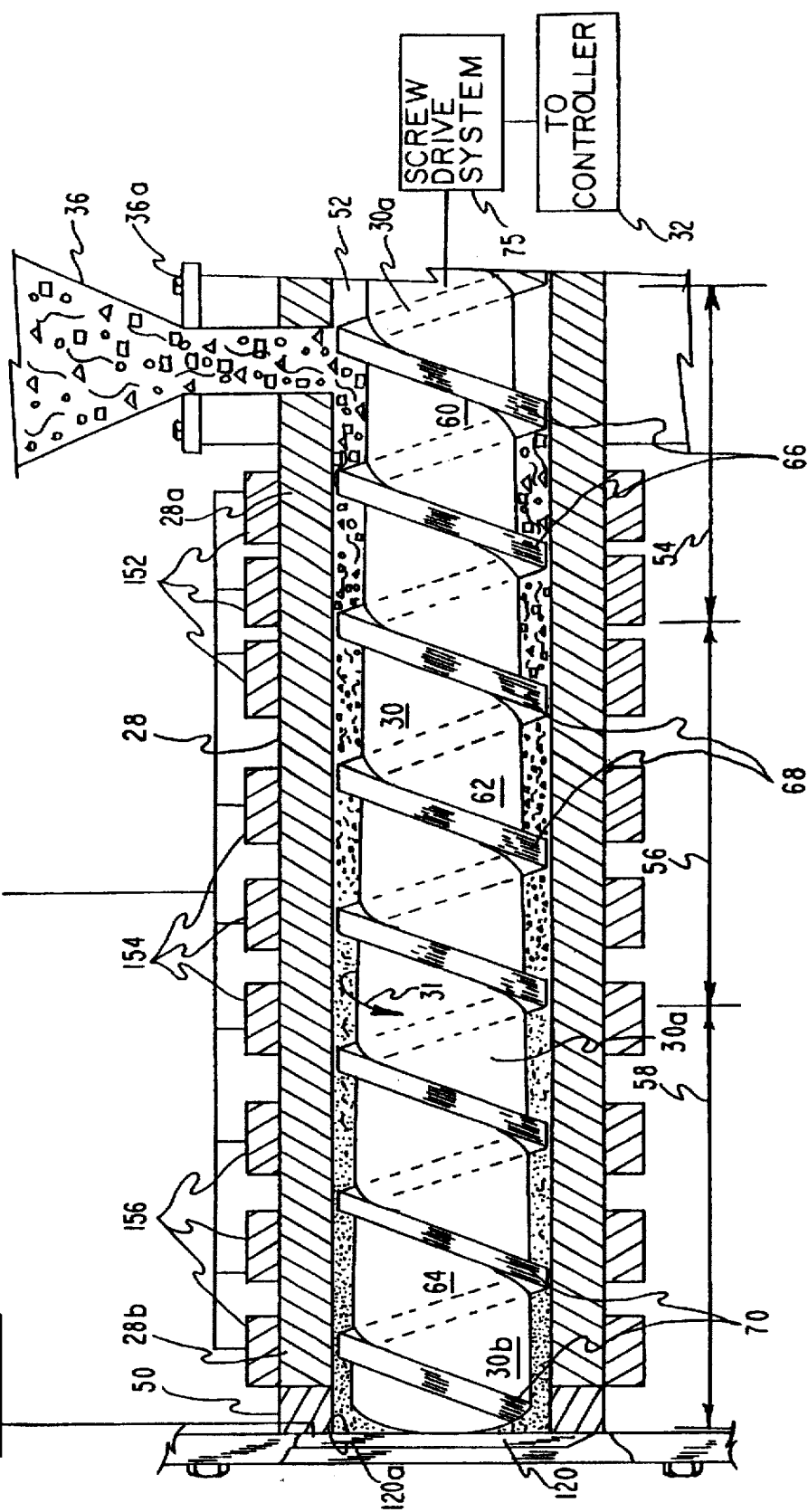
FIG. 5 is a sectional view showing the beginning of the plasticating process.

As the screw drive system 75 drives and forces molding materials 14 into a storage area 124 (FIG. 3) associated with the extruding portion 58 of barrel 28, the pressure in the barrel 28 begins to build. Such pressure increases as more of the molten suspension of molding materials 14 are forced and driven into the storage area 124. When such pressure reaches or exceeds the predetermined pressure being delivered to cylinders 88 and 90, the pressure causes screw 30 to withdraw from passageway 52 as shown in FIGS. 3-5. Consequently, by controlling the pressure delivered to cylinders 88 and 90, the density, volume and viscosity of the molten suspension and the billet 16 can be accurately controlled. By adjusting the pressure delivered to cylinders 88 and 90, the viscosity, volume and density of the molten suspension and billet 16 can be made to conform to the desired material characteristics and controlled. Although not shown, other types of regulators may be used. For example, electronic or pneumatic regulators may be provided which is coupled to controller 32 for automatically adjusting the pressure delivered to cylinders 88 and 90 and drive motor 92.

As best illustrated in FIG. 2, the system 10 also comprises sensing means or a second sensor for sensing the pressure in the power system 96. In the embodiment being described, the sensing means comprises a pressure gauge 126 for measuring the pressure being delivered by the hydraulic pump 100. In addition, sensing means also comprise pressure gauge 128 for sensing the pressure being delivered to cylinders 88 and 90. Although not shown, it should be appreciated that sensing means could comprise any suitable hydraulic, electronic or other suitable means which are capable of sensing the pressure being delivered by control block 106 to drive motor 92, knife driver 118, and cylinders 88 and 90.

Figure 14:
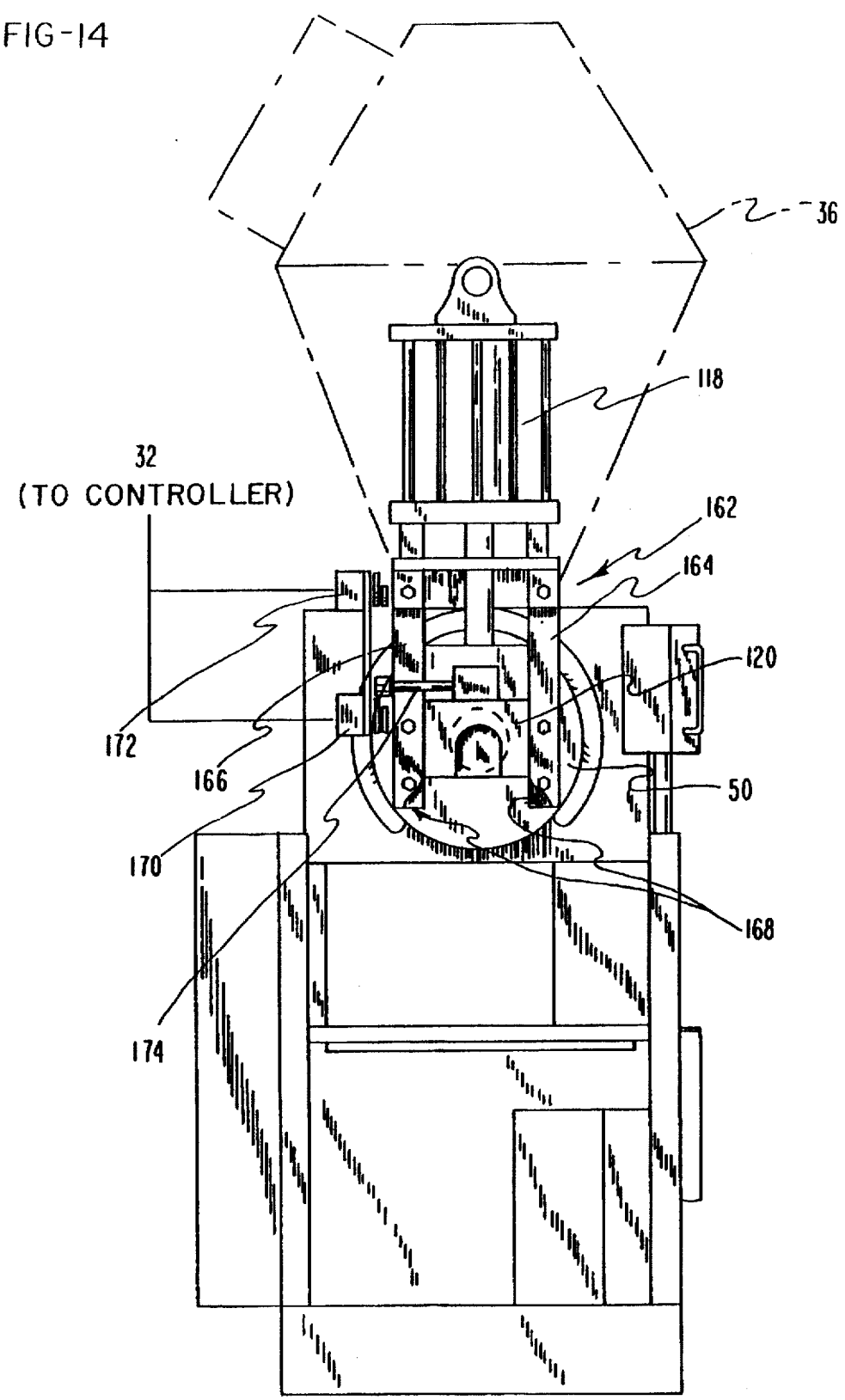
FIG. 14 is an end view of the plasticator showing a knife assembly used in the plasticator.

The plasticator 10 also comprises an adjustable distance sensor 130 which senses the travel distance of screw 30 as it withdraws from the passageway 52 of barrel 28. When the actual travel distance reaches a preset distance, the distance sensor 130 generates a distance signal which is received by controller 32. Upon receipt of the distance signal, controller 32 energizes pressure valves 108, 110, 114 and 116 to shut the fluid pressure being delivered to cylinders 88, 90 and drive motor 92. As described later herein, controller 32 may then energize pressure valve 112 to deliver fluid to knife driver 118 in order to drive knife blade 120 into the open position shown in FIGS. 9 and 15. Controller 32 may then energize control block 106 and pressure value 108 to actuate hydraulic cylinders to pull or slidably drive slidable block 78 towards stationary block 26 which causes the molten suspension to be extruded out of extruding opening 132 (FIG. 9) associated with the extruding end 28b of barrel 28. Controller 32 may then energize knife driver 118 to force knife blade back into the closed position shown in FIGS. 10 and 14 thereby severing the molten suspension to provide billet 16.

It should be noted that the distance sensor 134 comprises a bracket 136 which has an end 136a secured to slidable block 78. The distance sensor 134 also has a switch 138 secured to the bracket 136. A plurality of contact switches are slidably mounted on a panel 148 (FIG. 1) which is secured to stationary block 26. The panel 148 has distance indicia thereon, and the contact switches 140 can be slidably adjusted on the panel 148 to generally correspond to the volume of the billet 16 to be extruded from barrel 28. Thus, as slidable block 78 moves in the direction of arrow 122 and thereby causes screw 30 to withdraw from passageway 52, contact switch 140, for example, contacts switch 138, thereby generating the distance signal which is received by controller 32. Although not shown, it should be appreciated that the distance sensor could be any suitable means for measuring the size, including volume, of the billet 16 which is being created. For example, other suitable electrical, optical, hydraulic, pneumatic, or other types of sensors may be employed for measuring the distance the screw 30 and block 78 travels.

The system 10 comprises heating means or a heater for plasticating the molding material 14 using a single thermal cycle from introduction of materials 14 to molding a part or product from billet 16. As illustrated in FIGS. 1 and 2, the plasticator 10 comprises heating means or a heater system, 150, in the embodiment being described, which comprises three sets of resistance or heating bands 152, 154 and 156. The heating bands 152, 154 and 156 on the barrel 28 are associated with the feeding portion 54, blending portion 56 and extruding portion 58, respectively, as illustrated in FIGS. 3-5. The heating bands 152 heat the feeding portion 54 to a first predetermined temperature. Likewise, the heating bands 154 heat the blending portion 56 to a second predetermined temperature, and the heating bands 156 heat the extruding portion 58 to a third predetermined temperature.

The heating bands 152, 154 and 156 are coupled to heater controller 158 which is capable of energizing the heating bands 152, 154 and 156 to heat barrel 28 the first, second and third predetermined temperatures, respectively. The heater controller 158 comprises a third sensing means or a third sensor for sensing the actual temperature of the feeding portion 54, blending portion 56 and extruding portion 58, respectively, of barrel 28. The heater controller 158 also comprises display means or a display consisting of displays 160 (FIG. 2) for displaying the actual temperature sensed by heater controller 158. The heater controller 158 is coupled to controller 32 which may also control the operation of heater 150 in heating bands 152, 154 and 156. In the embodiment being described, the first predetermined temperature associated with the feeding portion 54 ranges from 300 to 500 degrees Fahrenheit, depending on the molding materials 14 being used. Likewise, the second and third predetermined temperatures may also range from 300 to 500 degrees Fahrenheit. Although these ranges are shown, they are not meant to be limiting and other ranges may be appropriate, depending upon the molding materials 14 and desired or predetermined billet characteristics being used.

Although not shown, the barrel 28 and heating bands 152, 154 and 156 may be insulated to facilitate minimizing heat loss in barrel 28.

The heating means may also include the preheater 48, a knife blade heater, and a mold heater 182, to facilitate providing one thermal rise. In the embodiment being described, the mold heater 182 may comprise Model Nos. S-8412 or 3412 Sterl-Tronic Temperature Control manufactured by Sterl Co. of Milwaukee, Wis. Furthermore, a screw heater (not shown) may also be provided to heat screw 30 to further facilitate heating the molding materials 14 in barrel 28.

The plasticator 12 also comprises a separator or knife assembly 162 (FIGS. 14 and 15) for separating the molding materials 14 to provide the billet 16. The knife assembly 162 is associated with the extruding ends 28b of barrel 28 and comprises a pair of L-shaped mounting brackets 164 and 166 which define a channel 168. The knife assembly 162 also comprises the knife blade or knife 120 which is slidable mounted in channel 168. The knife blade 120 is coupled to knife driver 118 which is capable of driving the knife from the closed position in FIG. 14 to the open position in FIG. 15 and vice versa. The knife driver 118 comprises a push/pull type cylinder in the embodiment being described which is coupled to pressure valve 112 which in turn is coupled to controller 32 as mentioned previously herein.

The knife assembly 162 comprises a pair of switches 170 and 172 which cooperate with a trigger bar 174 located on knife blade 120. The trigger 174 triggers switch 170 to generate a closed signal when the knife 120 is in the closed position. Likewise, the trigger 174 causes switch 172 to generate an open signal when the knife 120 is in the open position. The switches 170 and 172 are coupled to controller 32 which receive the open and closed signals.

It should be appreciated that due to the proximal location of the knife 120 to the extruding end 28b of barrel 28 and die 50, the knife 120 becomes heated to approximately the same temperature as the extruding portion 58 of barrel 28. Note also that when the knife 120 is in the closed position, it seals the passageway 52 (FIGS. 3 and 4) of barrel 28 so that the molded suspension of molding materials 14 can be forced against the barrel side 120a (FIG. 3) of knife 120. Although not shown, the knife 120 may also be provided with the knife heater mentioned above which would be coupled to controller 32 to facilitate heating the knife 120 to a predetermined knife blade temperature which would generally correspond to the third predetermined temperature.

The system 10 comprises press 18 (FIG. 1) which comprises a press driver 176 which is coupled to a press controller 178 which may also be coupled to controller 32. The press controller 178 may energize press driver 176 to drive platform 180 from an open or non-molding position shown in FIG. 1 to a closed or molding position (not shown). As illustrated in FIG. 1, platform 180 may have a mold member 20a which cooperates or mates with a complementary mold member 20b to mold the part. In the embodiment being described, the press 18 is a compression press like the 250 ton Bipel Press, manufactured by Bipel of England, and the press controller 178 may be a controller provided by Allen Bradley which may be coupled to controller 32.

The press 18 also comprises the press heater 182 mentioned above which is coupled to press controller 178 and which is capable of controlling the temperature of the mold members 20a and 20b when they are molding the part. In the embodiment being described, the mold heater 182 can vary the temperature of the mold members 20a and 20b from approximately 30° F. to 350° F. depending on the molding materials 14 being used. It is to be noted that the press 18 is a compression press which includes a pressure regulator 184 for regulating the pressure delivered to the billet 16. In the embodiment being described, the pressure can vary from 0 psi to 4000 psi. The press 18 also comprises a pressure gauge 186 and timer 188 for displaying the pressure and mold time, respectively, during corresponding operation of the press 18.

The system 10 also comprises conveyance means or a conveyance system 190 (FIG. 1). The function of the conveyance system 190 is to position billet 16 in mold member 20b after billet 16 is extruded from the extruding end 28b of barrel 28. In this regard, the conveyance system 190 may be any suitable means for conveying the billet 16 directly into the press 18, such as robotic arm, a hydraulic cylinder, a pneumatic cylinder, an electronic or mechanical conveyor or any other suitable means for causing billet 16 to be positioned in press 18. Furthermore, the conveyance system 190 may also comprise means for conveying or positioning the plasticator 12 in operative relationship with the mold member 20b such that when the billet 16 is extruded from barrel 28, it drops directly onto mold member 20b. In this regard, the conveyance system 190 may comprise a wheel, shuttle and track arrangement (not shown) onto which the plasticator 12 may be positioned such that the plasticator 12 may be slidably moved towards and away from press 18. For example, the shuttle and track system would be coupled to controller 32 so that when the press 18 moves to the open position shown in FIG. 1, the extruding end 28b of barrel 28 is moved into operative relationship underneath platform 180, such that when the billet 16 is extruded, it becomes positioned on mold member 20b as shown in FIG. 1. The plasticator 12 may then be moved or shuttled away from press 18 and the platform 180 driven downward (as viewed in FIG. 1) to mold the part. After the part is molded, it may be removed from the press 18 and, during such removal, the plasticator 12 may again be shuttled or moved to extrude the next billet 16 onto mold member 20b. Other variations of moving the plasticator 12 may also be used. For example, the conveyance system 190 may cause the plasticator 12 to withdraw from press 18 slowly so that the billet 16 is extruded substantially evenly over the length of the mold member 20b when the billet 16 is placed in the mold.

Figure 16B:
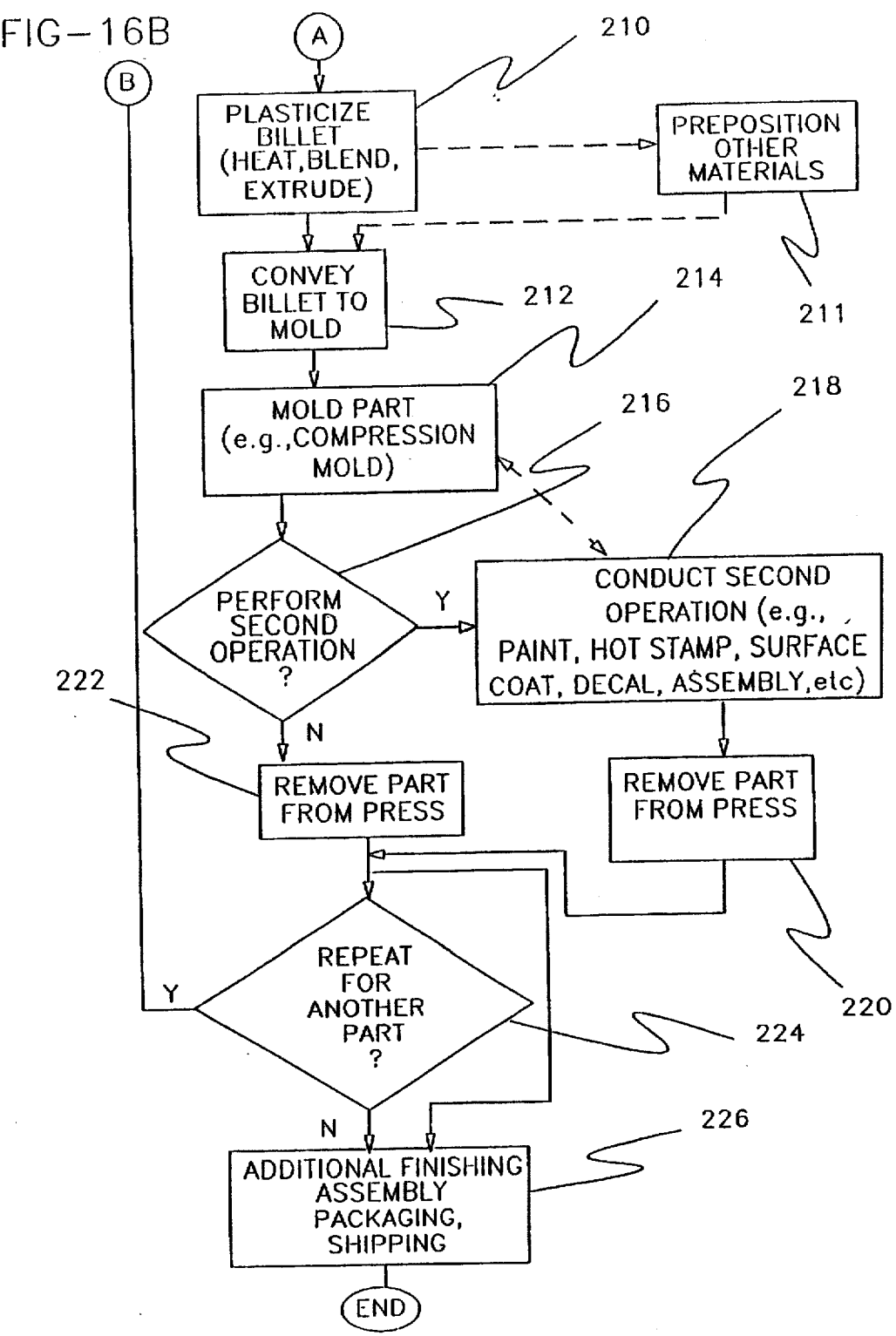
Figure 20:
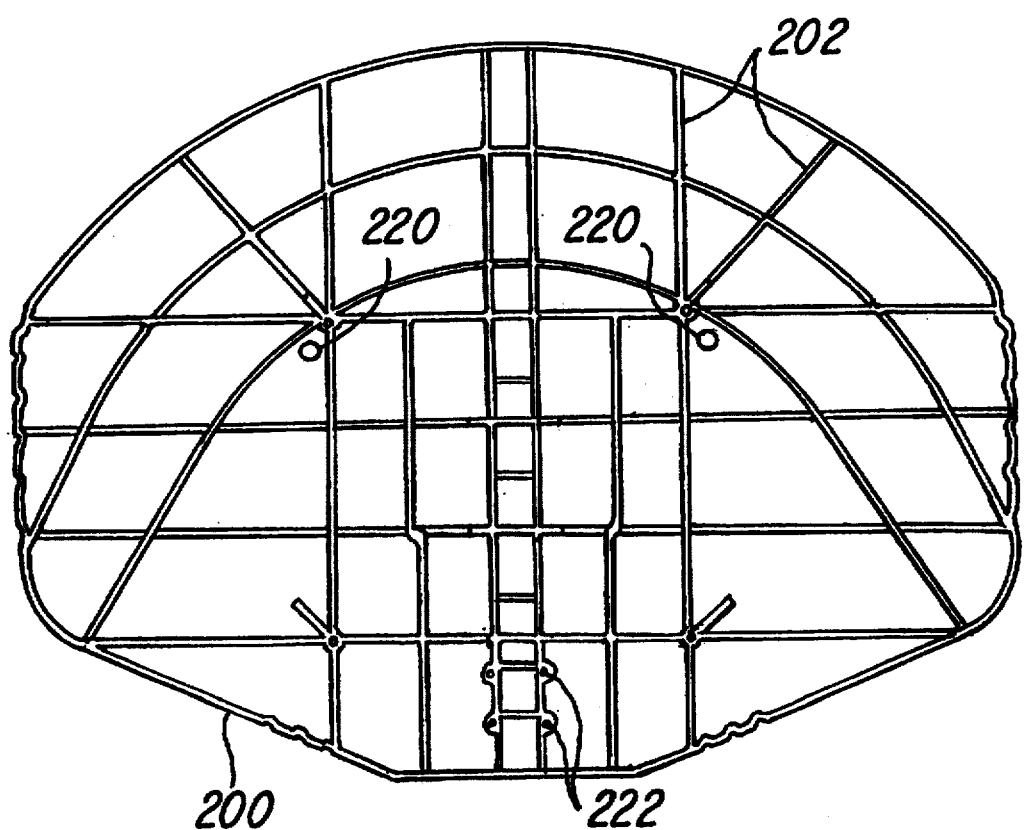
FIG. 20 is a rear view of the basketball backboard shown in FIG. 18 illustrating various ribs which facilitates strengthening the backboard.

The molding materials 14 are preferably comprised of a polyester 192, a carbocyclic or other carbocylics 194 and a preselected filler 196 (FIGS. 1, 16a and 16b). In the embodiment being described, the polyester 192 may include polyethylene terephthalate (PET), and the carbocylics 194 may be an olefinic such as polycarbonate, polypropylene (PP), polyethylene (PE) or ethylene vinyl acetate (EVA).

The preselected reinforcement or filler 196 may comprise a reinforcing fiber, glass fiber, fly ash, clay, carbon or graphite fiber, shredded reinforced fiber composite material, or like materials. It has been found that this apparatus and method can use fibers introduced to plasticator 12 with the other molding materials 14, without the fibers incurring significant damage. It should be appreciated, however, that this apparatus and system could be used with reinforced fibers, such as glass fibers, which range from the smallest available to as long as 6 inches.

A compatibility enhancing agent or agents 198 may also be included as one of the molding materials 14 which is added into feed hopper 36. It should be appreciated that the polyesters 192, carbocylics 194, preselected fillers 196 and compatibility enhancing agents 198 may take any suitable form which is capable of being received in the feed hopper 24, such as the form of chips, pellets, flakes and fibers. In addition, reinforcing fiber may take the form of single strands, shavings, mats, edge trimmings or shreddings as may be contained in shredded or reground reinforced composites containing such fibers in an existing polymer matrix. In other words, an existing thermoplastic polymer matrix having one or more of the above molding materials 14 may be, for example, shredded and used.

The compatibility enhancing agent or agents 198 are heat activated and are chosen so as to enhance the compatibility of the thermoplastic polymers, such as glass or glass fibers, and any other reinforcements or fillers which may be added. For example, olefinic polymers grafted with polar functional moieties such as acrylic acid or maleic anhydride may be mentioned. In this regard, the "Polybond" products available from BP Chemicals are presently preferred for use.

Preliminary studies have indicated that "Polybond" product grades 1000, 1001, 1002 and 1003 are suitable compatibility enhancing agents 198 that may be added to the thermoplastic polymers and fillers 196. These particular "Polybond" products are polypropylene based coupling agents grafted with CA. 6% acrylic acid. The only difference between these 4 grades of "Polybond" materials is in the melt flow rate "mfr". These range from 100 g/10 min. ("Polybond" 1000) to 12 g/10 min. ("Polybond" 1003). The skilled artisan can choose the particular desired mfr based upon the identity of the materials fed to the plasticator 12 and the initial processing viscosity thereof desired. Other exemplary compatibility enhancing agents 198 include "Polybond 1009 and 3009", both available from BP Chemicals. These polymers can be described as having high density polyethylene backbones grafted with either acrylic acid or maleic anhydride. The 1009 product is grafted with CA. 6% acrylic acid having a melt index of 6 g/10 min. while "Polybond" 3009 is grafted with about 2% maleic anhydride and has a melt index of about 6 g./10 min.

Other "Polybond" products can also be mentioned as being exemplary. These include the polypropylene based polymers grafted with varying amounts of maleic anhydride. For example, "Polybond" 3001 is described as a polypropylene polymer with grafted maleic anhydride branches present at a level of about less than ¼%. This product exhibits a melt flow rate of about 5 g./10 min. "Polybond" 3002 is also exemplary and is similar to the 3001 product except that its maleic anhydride content is about twice as high and that it exhibits a MFR of 7 g./10 min.

Additionally, free radical generating polymerization catalysts such as peroxides may be admixed with ethylenically unsaturated acids or anhydrides and used herein as compatibility enhancing agents.

Other exemplary compatibility enhancing agents include the EPOLENE polymers available from Eastman Chemical and other experimental nucleating agents also available from Eastman and that are specifically formulated for polyester rather than olefins. EPOLENE is a trademark of Eastman Chemical.

The compatibility enhancing agent 198 which are normally fed to the feed hopper 36 in an amount of 1 to 10 (% by weight) based upon the weight of the thermoplastic polymeric material used.

An advantage of the system 10 is that it is capable of handling post consumer molding materials or molding materials which have a relatively high degree of contamination. For example, the molding materials 14 may be commingled or contaminated polymeric material as typically found in the post consumer waste stream. While the nature of contaminants and the percent of occurrence varies from lot to lot as a natural feature of waste materials, they do, on average, typically contain similar materials and in similar quantities. For example, post consumer polyesters (collected in the waste stream as PET) used in this process may contain 90% PET, 5% HDPE, 2% PP, 0.5% EVA and the remainder contaminants, including such things as miscellaneous paper and aluminum scrap.

The invention will now be described with reference to a number of specific examples which are to be regarded solely as illustrative and not as restricting the scope of the invention.

EXAMPLE 1

First, molding materials were used without the compatibility enhancing agent 198. Sixty (60) parts of a mixed post consumer polymer batch comprising PET, HDPE, PP and ethylene vinyl acetate (EVA) and 40 parts of scrap (landfill destined) glass fiber edge trimmings having nominal 2 inch fiber lengths were charged to the single reciprocating screw plasticizer shown in FIG. 1. Compounding the billet 16 occurred in a single thermodynamic cycle with a temperature rise to 430 degrees Fahrenheit for a period of 30 seconds, at which time the resulting mixed and molten bulk molding billet 16 was delivered to the press where a 6"×9" sample, 0.150 inch thick, was molded at a pressure of 3000 psi. The molded billet 16 was subjected to physical property tests and was found to exhibit a flexural strength of 10,300 psi, a flexural modulus of 700,000 psi and a notched IZOD of 0.43. These characteristics are representative of a strong but brittle material considered to have minimum desirability in product fabrication.

EXAMPLE 2

A mix of one-half post consumer polyethylene terephthalate (PET) derived from soft drink bottles and one-half shredded scrap from a 40% glass reinforced polypropylene composite material resulting in short chopped glass lengths was charged to the plasticizer 12 shown in FIG. 1. Compounding in the barrel 8 occurred at 500 degrees Fahrenheit to 550 degrees Fahrenheit for a time period of 60 seconds. The sample was tested and exhibited an average 12,500 psi flexural strength, a 435,000 psi flexural modulus, and a notched IZOD of 5.7 ft.-lbs./inch. This represents a material with performance satisfactory for a wide range of product uses.

EXAMPLE 3

Another example includes the use of the compatibility enhancing agent 198. Sixty (60) parts of a mixed (commingled and contaminated) post consumer polymer batch and 40 parts of scrap (landfill destined) glass fiber edge trimmings with nominal 2" fiber lengths were charged to the plasticizer 12 shown in FIG. 1. The polymer material was primarily PET, but also contained polycarbonate, HDPE, polypropylene, EVA and non-polymer material such as scrap from aluminum cans and paper. A compatibility enhancing agent 198 (Polybond 3009) was added to the mix in the plasticizer 12 at a ratio of 3% by weight based upon the weight of polymeric material fed. The first, second and third predetermined temperatures were set at 490 degrees Fahrenheit, 520 degrees Fahrenheit, 530 degrees Fahrenheit, respectively, in the feeding plasticating area, and 540 degrees Fahrenheit in the delivery area. The knife head 96 was set to 550 degrees Fahrenheit. The distance sensor was set a 110 mm. The plasticizer 12 was operated with a screw speed of 20–40 rpm and cylinders 88 and 90 were set at 300 psi such that pressure of 50 psi building to 300 psi resulted in the reciprocating screw 42 being pushed by barrel back pressure to the 110 mm position. At this time (after about three total minutes from introduction of materials to the plasticizer 12), a mixed and molten billet 16 was then delivered to the press 18 with mold faces 20a and 20b thereof heated to 80 degrees Fahrenheit. A 6"×9" sample, 0.150 inch thick, was then molded at a pressure of 3,000 psi. The sample was tested and exhibited a flexural strength of 20,310 psi, a flexural modulus of 980,000 and a notched IZOD of 3.03 ft.-lbs./inch. This material would be suitable for a wide range of product applications having strength and modulus properties analogous to commercially available and widely used glass reinforced thermoplastic sheet materials.

A method and process for using system 10 and for creating in billet 16 for molding a part will now be described. First, a post-consumer recyclable plastic, such as PET, polypropylene, polyethylene and ethylene vinyl acetate are collected as shown at step 200. If desired, these recyclable polymers may be separated (for example) by flotation separation (as shown in block 202). The contaminated polyesters 192 and carbocylics 194 along with the preselected reinforcements and fillers 196 are loaded into feed hopper 36 (FIG. 1) of plasticator 12 as shown in block 204. As mentioned earlier herein, the compatibility enhancing agent 198 may also be added at this time, if desired.

It may be desirable to preheat the molding materials (block 206), in which case controller 30 energizes preheater 48 to preheat the molding materials 14 (block 208) to approximately 100° to 350° F., depending on the molding materials 14 selected. Controller 32 then energizes drive motor 42 to rotatably drive agitator 40 to begin mixing the molding materials 14 in feed hopper 36.

At block 210 a billet 16 is plasticized. Depending upon the part being molded, the predetermined characteristics of billet 16 are determined. Thus, the volume, density and length, for example, of billet 16 are determined. Once determined, the variable pressure regulator 117 associated with cylinders 88 and 90 is adjusted to a pressure which generally corresponds to the billet characteristics selected. In addition, one or more of the contact switches 140 of distance sensor 134 are adjusted to correspond to the length and volume of the billet 16 desired. In addition, the variable pressure regulator 117 associated with drive motor 92 is also adjusted so that drive motor 92 drives screw 32 at an appropriate rpm. The controller 32 is also programmed with the first, second and third predetermined temperatures so that heating controller 158 energizes the plurality of heaters 152, 154 and 156 to heat the feeding, blending and extruding portions 54, 56 and 58 to the appropriate temperature. For purposes of illustration only, it will be assumed that the pressure regulator 117 was set at 300 psi, the power system 96 pressure was set at 1000 psi, and the pressure regulator associated with drive motor 92 was set at 25 rpm, with contact switch 140 being set at approximately 110 millimeters.

The molding materials 14 are then introduced to the feeding opening 46 (FIG. 5). As best illustrated in FIGS. 4–10, controller 32 energizes drive motor 92 of screw drive system 75 to rotatably drive screw 30 such that the molding materials 14 are gradually blended together into a mixed molten suspension period.

The molding materials 14 are heated to approximately the first predetermined temperature when they are introduced between feeding portion 54 of barrel 28 and feeding section 60 of screw 30. Note that, due to depth 72 (FIG. 3) and pitch of the flights of the first plurality of threads 66, the molding materials 14 start to become blended such that the reinforcing fibers, like glass fibers, are not damaged. As screw 30 rotates in the direction of arrow 31 in FIG. 5, the molding materials 14 are forced from the feeding section 60 of screw 30 to the blending section 62 which is associated with blending portion 56 of barrel 28 when the screw 30 is in the home position shown in FIGS. 3 and 4. Notice also that because of the taper of the core 30a of screw 30, the molding materials 14 become blended into a more homogeneous suspension at the blending section 62 where the suspension is heated to approximately the second predetermined temperature mentioned earlier herein. To further facilitate the mixing and blending of the molding materials 14, the screw 30 may be provided with a blending section 62 having a second plurality of threads 68 (FIG. 4) with a pitch which is generally smaller than the pitch of the first plurality of threads 66. Varying the number of threads per inch, pitch of threads and thread depth facilitates accurately controlling the suspension and blending time of the molding materials 14, controlling the volume and density of billet 16, and controlling the velocity at which the molding materials 14 are plasticated.

Figure 6:
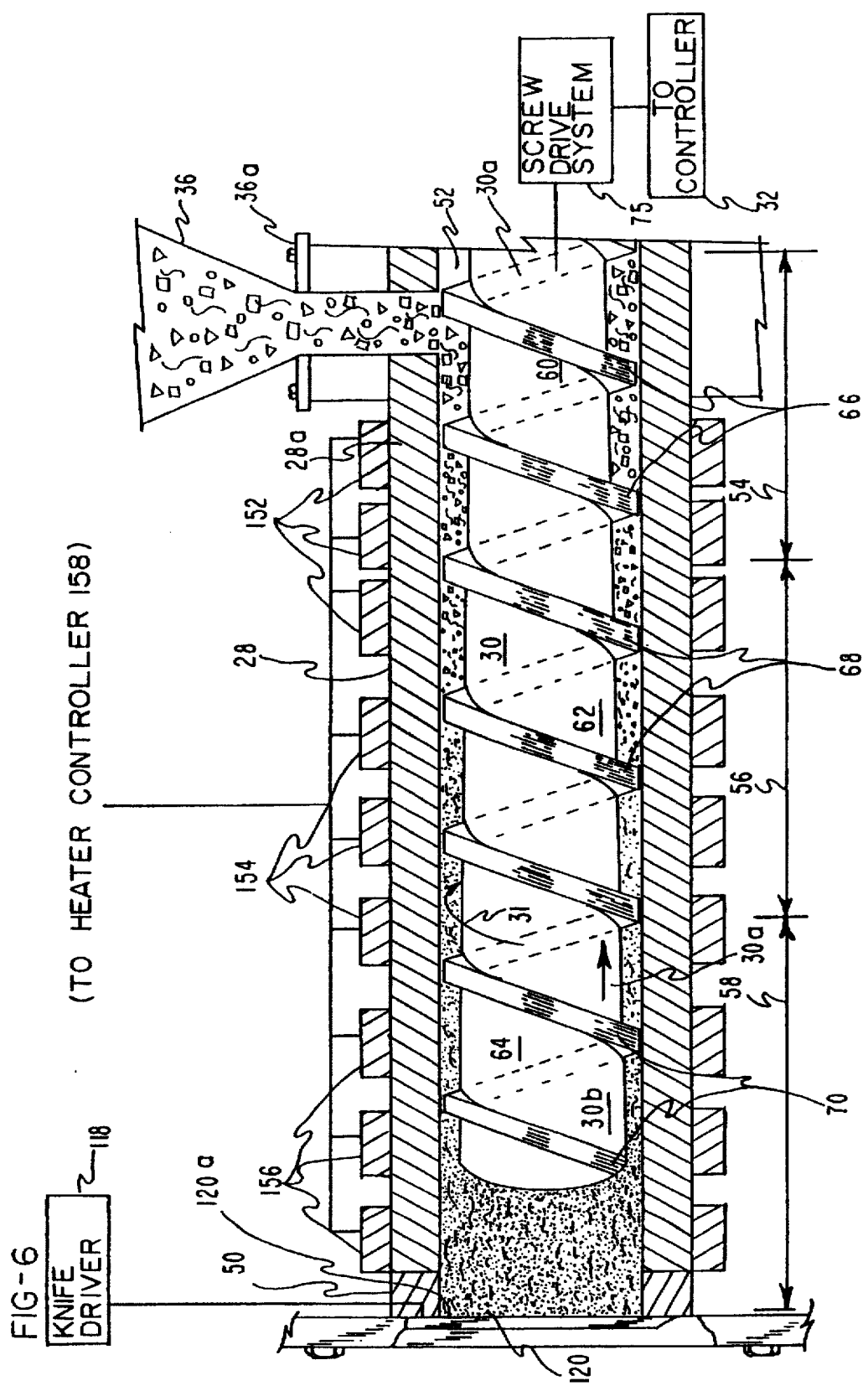
FIG. 6 is a sectional view similar to FIG. 5 showing the screw withdrawing from a passageway in the barrel.

As the screw drive system 75 continues to drive screw 30 as mentioned above, the mixed suspension is forced toward the storage area 124 associated with the extruding portion 58 of barrel 28. In the storage area 124, the molten suspension is collected, further blended and heated to approximately the third predetermined temperature. The mixed molten suspension ultimately engages the side 120a (FIG. 5) of knife 120 and begins forming billet 16 as shown in FIG. 6. As the molten suspension continues to collect in storage area 124, the pressure begins to build.

Figure 7:
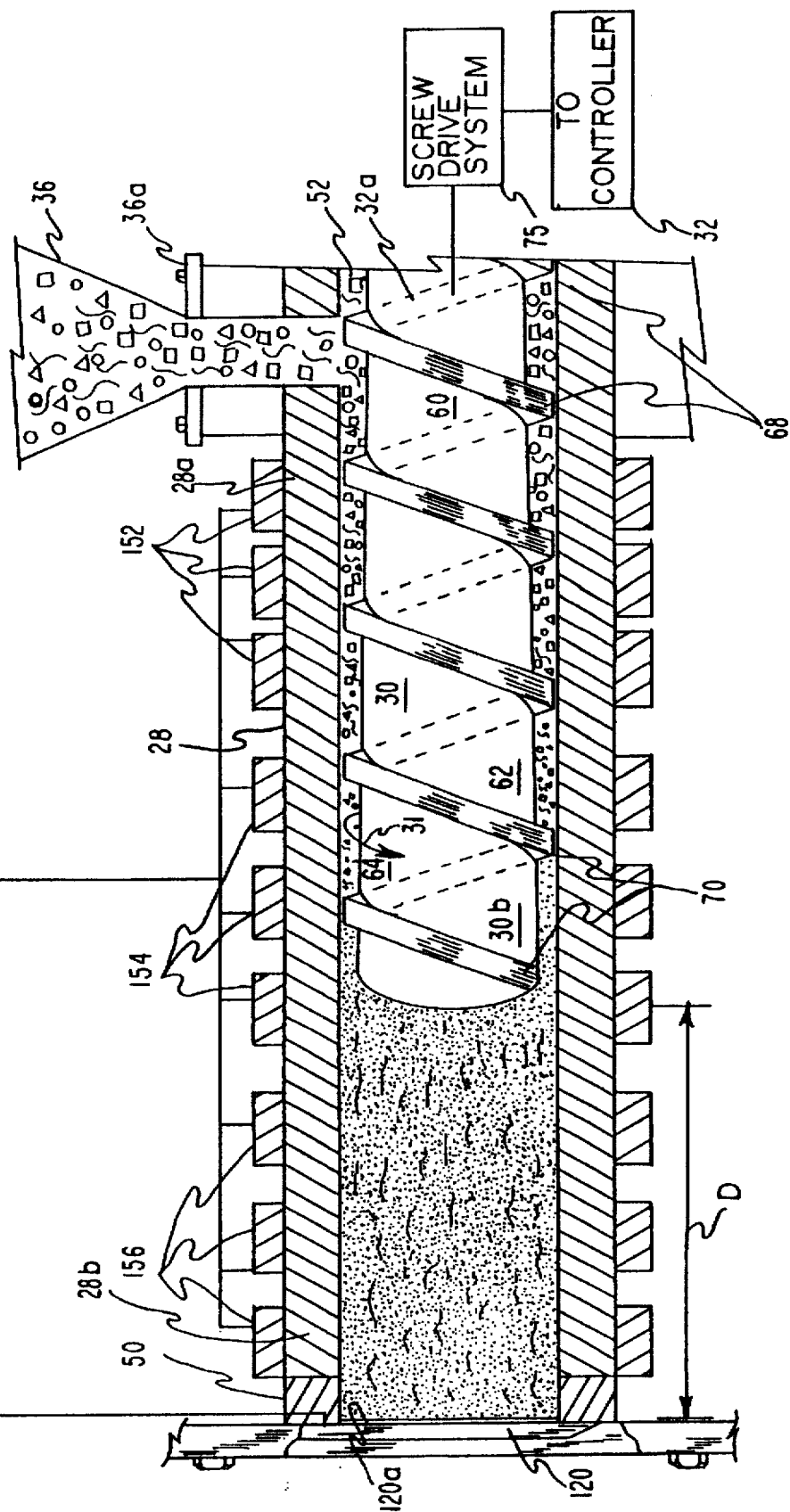
FIG. 7 is another view showing the screw withdrawing further from the passageway in the barrel.
Figure 8:
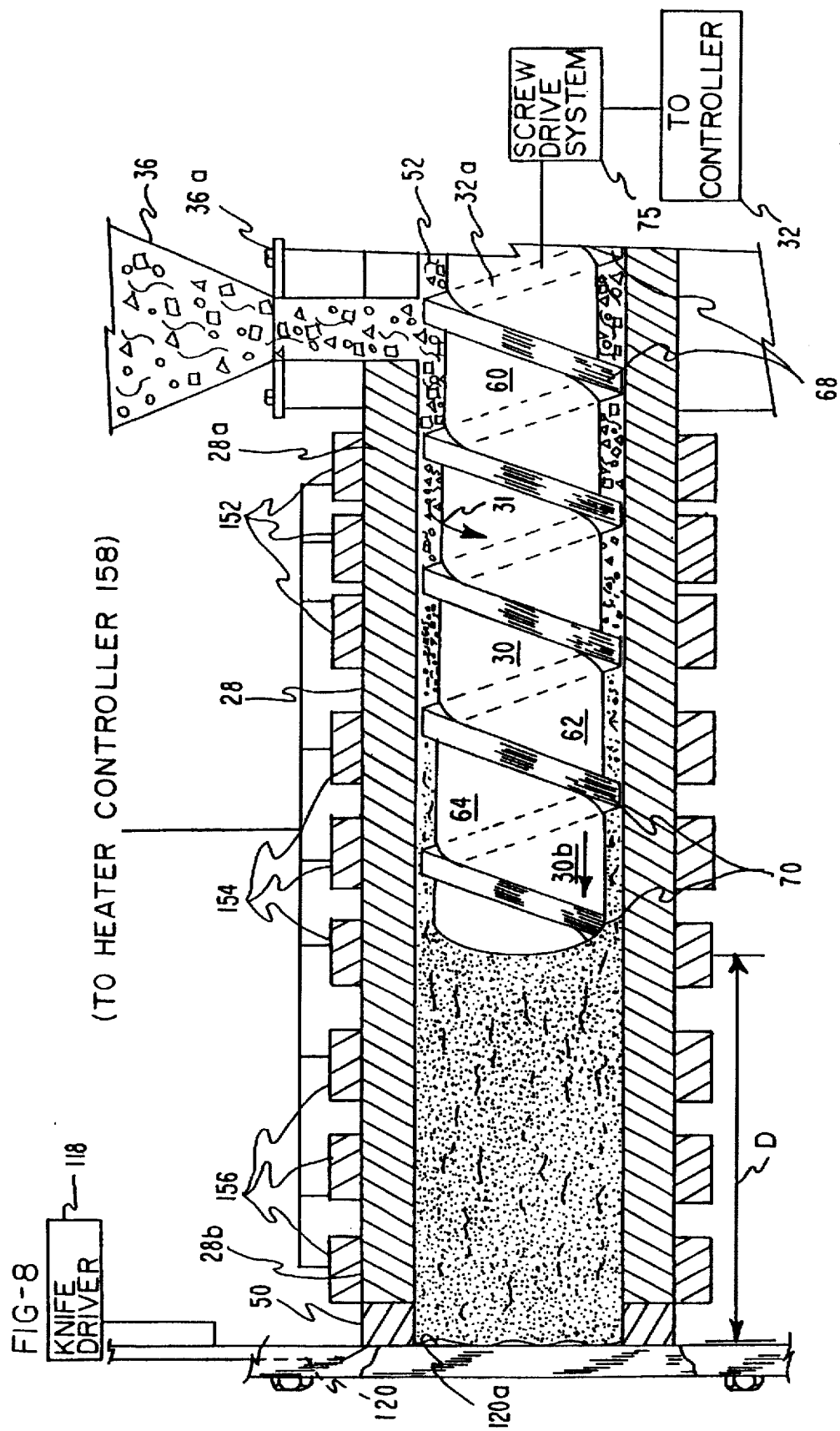
FIG. 8 is a view similar to FIG. 7 showing a knife blade in an open position.
Figure 9:
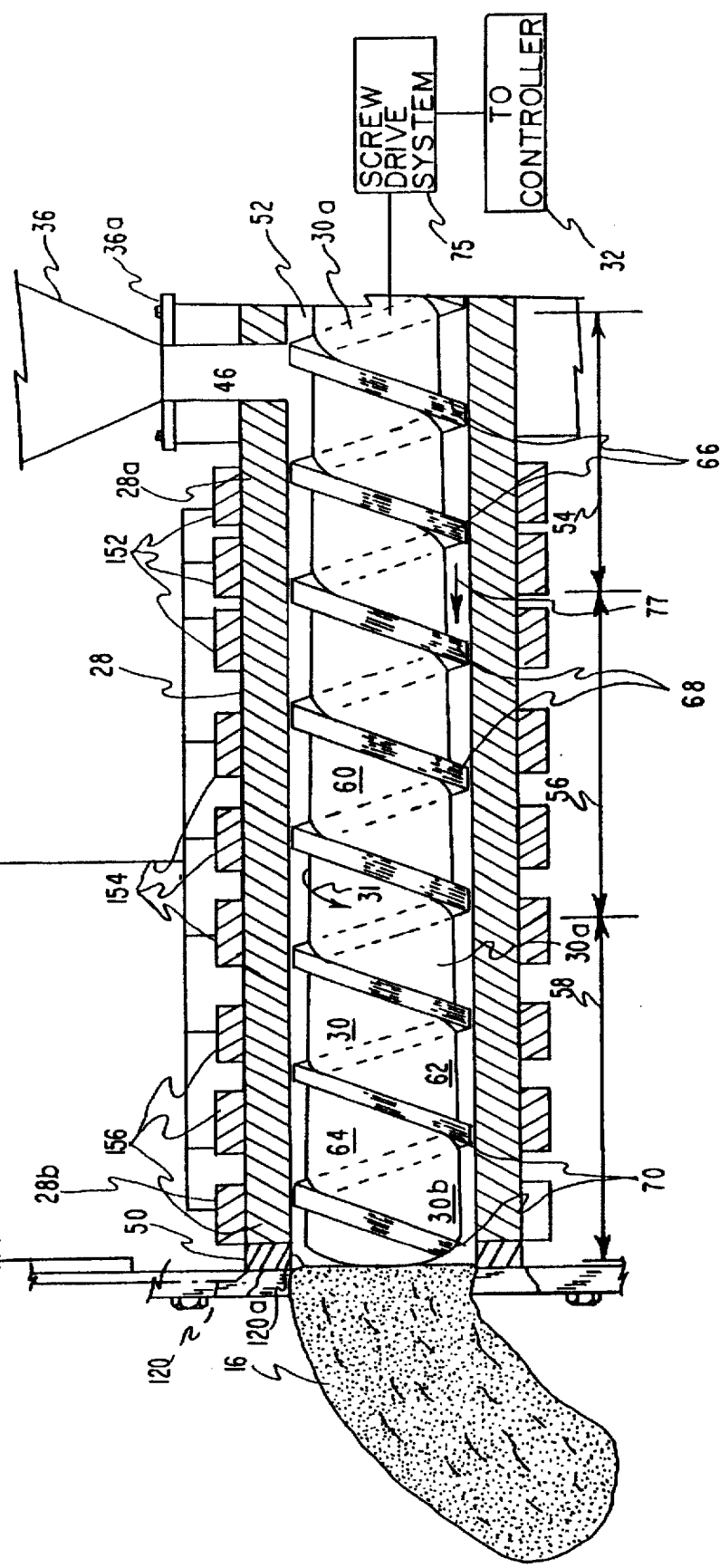
FIG. 9 is a view showing the screw acting as a plunger and forcing the mixed suspension of molding materials out of an extrusion end of the barrel.
Figure 10:
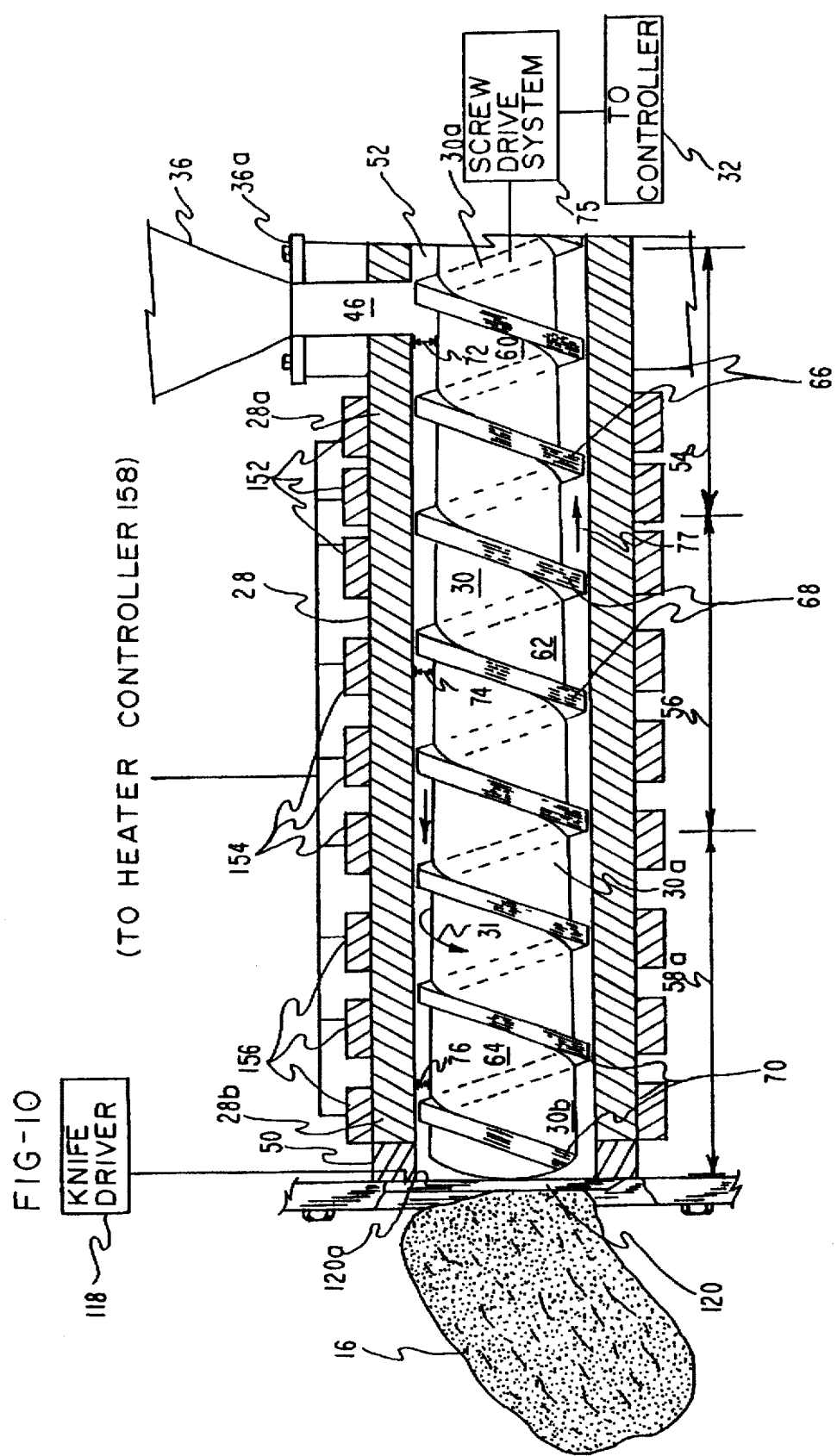
FIG. 10 is a view similar to FIG. 9 showing the knife in the closed position, thereby severing the mixed suspension of molding materials to provide a billet.
Figure 15:
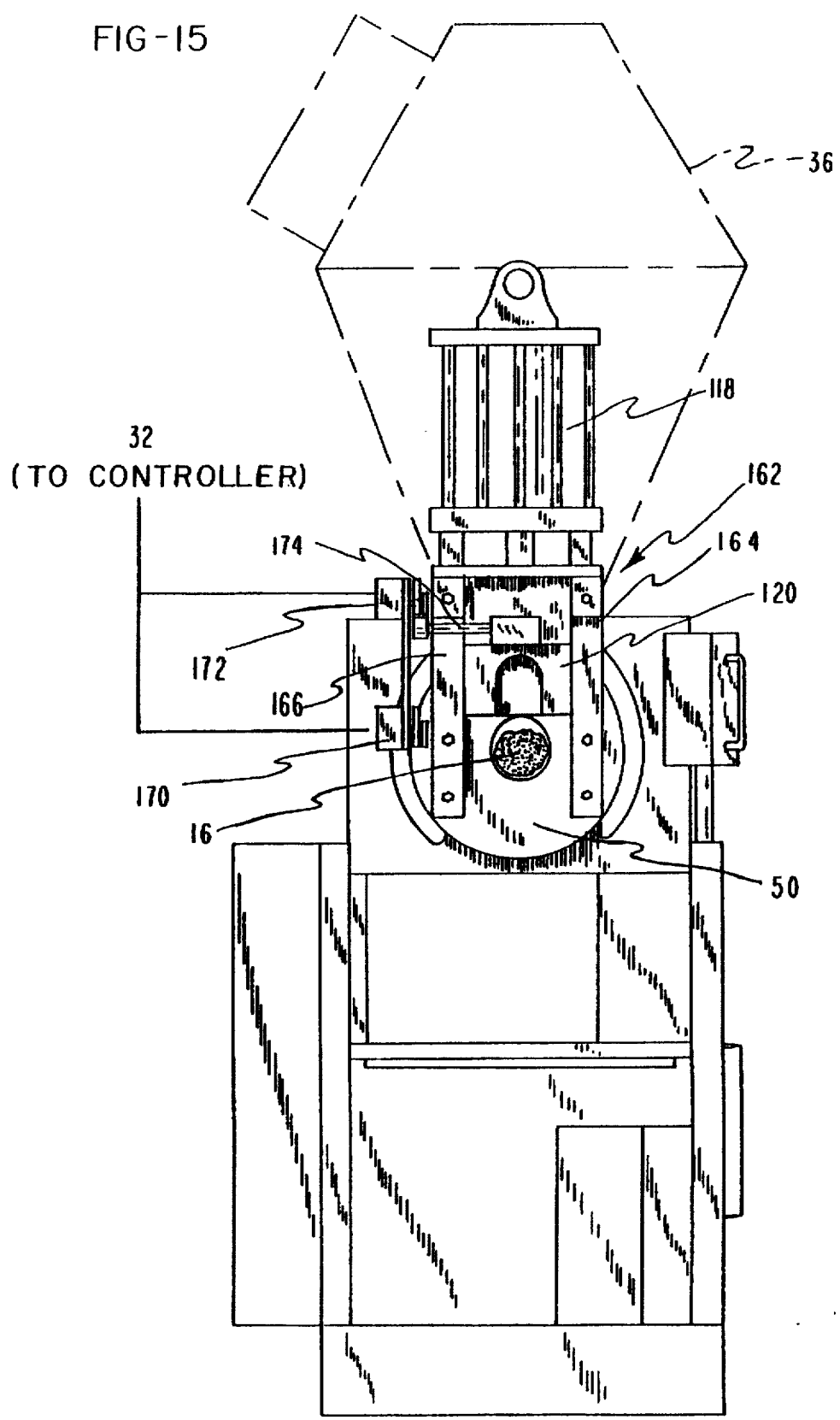
FIG. 15 is a view similar to FIG. 14 showing a knife activated to a fully open position.

As the pressure approaches or exceeds 300 psi (i. e., the pressure applied to cylinders 88 and 90) the biasing pressure of cylinders 88 and 90 is overcome and the screw 30 begins withdrawing from passageway 52, thereby causing slidable block 78 to move in the direction of arrow 122 (FIG. 1). As shown in FIGS. 6–8, the molten suspension begins building in the storage area 124. The slidable block 78 moves in the direction of arrow 122 until contact switch 140 contacts switch 138 to generate the distance signal which is received by controller 32. Controller 32 then energizes pressure valves 114 and 116 to stop drive motor 92. Controller 32 also energizes pressure valve 110 to energize knife drive 118 to cause knife blade 120 to move from the closed position (FIGS. 8 and 14) to an open position (FIGS. 9 and 15). Controller 32 then energizes pressure valves 108 and 110 to actuate cylinders 88 and 90 to pull slidable block 78 in a direction opposite arrow 122, thereby causing the molten suspension to be extruded through extruding opening 132 (FIGS. 9 and 15). Controller 32 may then energize pressure valve 112 to actuate knife driver 118 to force knife blade 120 into the closed position, thereby separating the molten suspension to provide billet 16.

Although not shown, it should be appreciated that the controller 32 may cause the screw drive 75 and knife assembly 162 to provide a plurality of billets 16 during a single stroke length of the cylinders 88 and 90.

The billet 16 may then be conveyed (block 212 in FIG. 16) to mold member 20b in press 18 by the conveyance system 190 (FIG. 1). Other materials, such as sheet coating material or reinforcement material may be prepositioned (block 211) in the lower mold member 20b prior to introducing billet 16 into the mold member 20b. Once located in the press 18, controller 32 may energize press controller to, in turn, energize press driver 176 to drive platform 180 downward (as viewed in FIG. 1) to cause the part to be molded. In the example being described, the mold heater 182 heats the molding members 20a and 20b to approximately 80 degrees Fahrenheit. In addition, the press 18 is set to compress billet 16 at approximately 3000 psi with a controlled pressure gradient.

At block 214 (FIG. 16b), the part is then molded by press 18.

As shown in decision block 216, it may be desirable to perform a second operation on the part before it is removed from the press 18 or when the billet 16 is molded. If such an operation is desired, it is conducted (block 218) and then the part is removed from the press 18 (block 220). In this regard, a second operation may comprise painting or otherwise placing a coating on the part, hot stamping a decal on the part, partially assembling the part, or molding or embossing a symbol on the part. If a second operation is not performed on the part, the part is removed from the press 18 at block 222.

Note that it may be desirable to integrally mold a surface texture or finish to the part during the molding process. For example, a plastic sheet or film, such as the Teslin™ sheet, manufactured by PPG Industries of Pittsburgh, Pa., may be integrally molded into the surface of the part. For example, if the plastic sheet was selected, it would be cut to the dimensions of the mold and placed in the mold prior to molding. The side of the sheet which contacts the mold may be coated with an acrylic finish to prevent the sheet from adhering to the mold during the molding process. After the sheet is placed in the mold, the billet 16 can be placed on the sheet and the part molded as described. If desired, a sheet could be placed on both mold members 20a and 20b before billet 16 is placed on mold member 20a. The billet 16 would then be placed on the sheet and molded as described above. This facilitates producing a part having a desired surface texture or finish on both sides. It is to be noted that, after the molding process, the polymer sheet is integral with the part.

It should be appreciated that other types of materials may be integrally molded into the part or into the surface of the part. For example, wood veneer sheets, burlap, or metal wire mesh may be molded into the part or into the surface of the part.

Returning to block 224 in FIG. 16b, once the molding process is completed and the part is removed from the press, the process can be repeated for another part. At block 226, subsequent operations, such as additional graphics, sheet material or printing, assembly, packaging and the like may be performed on the part.

Advantageously, this invention provides a system and method for using relatively highly contaminated post-consumer polyesters and carbocylics (such as olefinics). The system and method also facilitates evenly mixing reinforced fibers having a length of 2.0 inches or more, without damaging the fibers during the compounding, plasticating, extrusion and compression molding process.

Such post-consumer scrap would normally require additional cleaning and separation before use. This invention provides an apparatus and process for using the contaminated post-consumer materials to produce a part which has physical, chemical and mechanical properties similar to non-recycled materials.

Further, the method and apparatus provides a system for molding the molding materials 14 into a part using only a single thermal heat rise by controlling, coordinating and sequencing the temperature rise of the molding materials 14 as they go through the system 10. Using the single thermal heat rise facilitates enhancing the molecular orientation of the polymers which, in turn, causes the resultant part to have enhanced strength characteristics when compared to other types of molding processes. Also, a single heat rise facilitates reducing the material degradation that occurs to thermoplastic materials when they are heated. Further, because the pressures in the press 18 are adjustable, the surface texture or finish or the resultant part can be controlled to enhance the aesthetic or functional appeal of the part.

The invention also provides a method and apparatus which is advantageous because it reduces or eliminates many of the intermediate handling and thermocycles from receipt of the post-consumer materials to the molding of the part.

The described method and apparatus may utilize compatibility enhancing agent 198 which promote chemical bonding, for example, by increasing the presence of hydroxyl groups and the reinforcing fibers while they aid in the dispersion of reinforcement within the molten suspension.

Finally, molecular orientation within the billet 16 is enhanced by controlling the compression pressures and temperatures in press 18.

Advantageously, it should be appreciated that long fiber length can be maintained by reducing the tortuous nature of the material path existing in many prior art devices and processes. This improvement of the path results from screw thread depths that allow fibers to move intact, allowing the screw to float on a film of molten material between itself and the barrel. The lack of small orifices in delivering the material through the plasticator 12 and the molding process allows forming without constraining the movement of fibers to form the part.

Referring now to FIGS. 17–20, another embodiment is shown illustrating the use of the system and method for molding an item of sporting goods equipment, such as a basketball backboard 200 (FIG. 18). In this embodiment, the press 18 comprises the upper molding member 20a' and lower molding member 20b' which cooperates to protect the backboard 200 illustrated in FIGS. 18 and 20. Although not shown, the upper molding member 20a' comprises a rib forming section (not shown) for forming a plurality of ribs 202 (FIGS. 19 and 20) which facilitates strengthening the basketball backboard 200 as conventionally known. The lower mold member 20b' comprises a plurality of recess-forming areas 201 for forming angled recesses 207 (FIG. 18) in backboard 200.

As mentioned earlier herein, the system and method of the present invention causes the resultant part (in this case, the basketball backboard 200) to have enhanced strength characteristics when compared to other types of molding processes. This, in turn, facilitates reducing the number of reinforcing or rib members 202 and also facilitates reducing the material and manufacturing costs associated with producing backboard 200 in the manner described herein.

As mentioned earlier, it may be desirable to integrally mold a surface texture or finish to the part during the molding process. In the embodiment being described, a plastic sheet or film 204 (FIG. 17) may be provided comprising a front side 204a and a backside 204b which becomes molded such that it is an integral part of the backboard 200. It should be appreciated that the sheet 204 comprises graphics 206 or printed information on the front surface 204a which faces outward away from backboard 200. In this regard, the printing information may comprise a company name, association affiliation, rectangular target, such as target 208 in FIG. 18, or other graphics as may be desired.

In the embodiment being described, the mold member 20b' (FIG. 17) may comprise a plurality of locating pins 210 which cooperate with the plurality of holes or apertures 212 on sheet 204 to facilitate locating the sheet mold member 20b'.

The lower mold member 20b' may also comprise a plurality of pins 216 which form a plurality of holes 220 (FIG. 18) for mounting backboard 200 onto a frame or pole (not shown) using suitable fasteners, such as bolts and the like. Notice also that locating pins 210 facilitate defining holes 222 (FIG. 20) for attaching a rim (shown in phantom in FIG. 18) using suitable fasteners, such as bolts, screws and the like (not shown).

It should also be appreciated that the mold member 20b' may be textured or roughened in order to facilitate preventing the sheet 204 from moving once it is placed onto mold member 20b' as described below. In this regard, it has been found that sandblasting a surface 214 of mold member 20b' provides enough texture to facilitate preventing the sheet 204 from moving on mold member 20b'. Also, an electric charge may be put to the sheet 204 before or after the sheet is placed in the mold. This also facilitates preventing the sheet 204 from moving on mold member 20b'.

Notice that the lower mold member 20b' may comprise a graphic sheet receiving area 222 (FIG. 17) and a bordering raised area 224. In this regard, it should be appreciated that the border area 224 facilitates defining a molded border 226 (FIG. 18) having a surface 226a (FIG. 19) which is generally co-planer with surface 204a of sheet 204 after the sheet 204 is compression molded as described.

In operation, the upper and lower mold members 20a' and 20b' are mounted on press 18 in a manner conventionally known. When it is desired to mold backboard 200, the sheet 304 is placed onto lower mold member 20b'. Next, the conveyance system 190 (FIG. 1) positions billet 16 onto sheet 204 in mold member 20b' after billet 16 is extruded from the extruding end 28b of barrel 28 of plasticator 12. As mentioned earlier herein, other materials, such as sheet coating material or reinforcement material may be preposition (block 211 in FIG. 16) in the lower mold member 20b' prior to introducing billet 16 into the mold member 20b'. As also mentioned previously herein, sheet 204 or side 204b of sheet 204 which contacts upper mold member 20a' may be coated with a finish to prevent the sheet 204 from adhering to the mold member 20a' during the molding process.

Once the sheet 204 and billet 16 are positioned between mold members 20a' and 20b' as illustrated in FIG. 17, controller 32 may energize press controller 178 to, in turn, energize press driver 176 (FIG. 1) to drive platform 180 downward as viewed in FIG. 1 to cause the part (i.e., the backboard 200) to be molded.

EXAMPLE 4

An illustration for molding backboard 200 will now be described. First, billet 16 is formed when plasticator 12 is charged with a mixture of about 83% mixed recycled thermoplastic polyolefins mentioned earlier, 1% compatibility enhancing agent, and 16% glass longer than one-quarter inch. The mixture is heated to a temperature of 450 degrees fahrenheit while being blended into the homogeneous billet 16 in the plasticator 12, and is collected in the plasticator storage area 124 at a pressure of 300 psi.

The backboard mold members 20a' and 20b' in the compression molding press 18 are set to a temperature of about eighty degrees fahrenheit and the mold is prepared for molding the part by properly orienting a printed sheet 204 of the aforementioned Teslin with the printed side 204a face down in the mold member 20b'. The plasticator 12 is set to deliver about a thirteen pound billet 16 which is transferred by conveyor system 190 to the press 18 and placed atop the Teslin® sheet 204. The compression molding press 18 is then closed and delivers a pressure of about 2,000 psi for thirty seconds, at which time the pressure reduces to 500 psi for another thirty seconds. The press 18 is then opened and the finished backboard 200 with integrally molded graphic sheet 200 is removed from the press 18.

It should be appreciated that the upper and lower mold members 20a' and 20b' are at a lower temperature (i.e., about 80 degrees fahrenheit) relative to billet 16 which is relatively much hotter (i.e., on the order of between 300 to 500 degrees). Because of this temperature differential, the molten billet 16 tends to bond quickly to the back surface 204b of sheet 204 during the compression molding process. As the molten plastic or billet 16 cools, the graphic sheet 204 becomes integral with backboard 200. The temperature differential also facilitates melting the Teslin® at a rate such that it cools before melting graphics 206 on surface 204a.

After the backboard is molded, backboard 200 may subsequently be mounted onto a suitable frame (not shown) which, in turn, is mounted on a pole or other support structure for supporting the backboard 200 above the ground.

EXAMPLE 5

In another embodiment of the invention, a process for making point-of-purchase display or sign 300 (FIG. 21). The plasticator 12 is charged with a mixture of 95% mixed recycled thermoplastic polyolefins and 5% glass longer than one-quarter inch. The mixture is heated to a temperature of 450 degrees fahrenheit while being blended into a homogeneous material in the plasticator 12, and is collected in the plasticator storage area 124 at a pressure of 300 psi. The point of purchase display product mold (not shown), which comprises a shape which complements the shape of the display 300, is placed in the compression molding press 18 and is set to a temperature of about 80 degrees fahrenheit. The mold is prepared for molding the display 300 by properly orienting a lithographically printed side 302 of a sheet of Teslin® having desired printed information situated face down in the mold. The plasticator 12 is set to deliver a ten ounce billet 16 which is transferred to the mold and placed atop the Teslin® sheet. The compression molding press 18 is then closed and delivers a pressure of 2,000 psi for fifteen seconds at which time the pressure reduces to 500 psi for another twenty-five seconds. The press 18 is then opened and the finished point of display or sign 300 with printed graphic sheet integrally molded therein is removed from the mold.

While the invention has been described with reference to certain specific embodiments, this description is merely illustrative, and is not to be construed as limiting the scope of the invention. Various other modifications and changes may occur to those skilled in the art without departing from the spirit and scope of the invention as defined by the appended claims.

We claim:

1. A method for molding a part comprising the steps of:
    loading a barrel of a plasticator with a plurality of molding materials comprising a plurality of thermoplastic polymers and long reinforcing fibers, said barrel having a screw rotatable mounted therein;

heating said barrel;

rotatable driving said screw to blend said plurality of molding materials together to create a molten suspension in a storage area of said barrel such that a majority of said long reinforcing fibers remain intact;

axially retracting said screw in a first direction as said molten suspension is accumulated in said storage area;

axially driving said screw in a second direction to force said molten suspension out of said barrel, said second direction being opposite said first direction;

severing said molten suspension to provide a billet;

laying a sheet into a mold, said sheet comprises a graphic image on a side thereof;

placing said billet onto said sheet; and integrally molding said sheet into said part.

2. The process as recited in claim 1 wherein said method further comprises the step of:

using a press having a capacity of at least 250 tons to form the billet into said part.

3. The process as recited in claim 2 wherein said method further comprises the step of:

molding the billet into the part having graphic images molded into a surface of the part.

4. The process as recited in claim 3 wherein said method further comprises the step of:

using a compression press.

5. The process as recited in claim 3 wherein said process further comprises the step of:

cleaning some of the molding materials before loading.

6. The process as recited in claim 3 where said part is a basketball backboard.

7. The process as recited in claim 3 where said part is a point-of-purchase display.

8. The process as recited in claim 2 wherein said molding step further comprises the step of:

using a compression press to mold the billet into the part.

9. The process as recited in claim 2 wherein said loading step comprises the step of:

loading a plurality of thermoplastic polymers and long reinforcing fibers into the plasticator.

10. The process as recited in claim 9 wherein said plurality of materials comprise about 60–95% thermoplastic polymers and 5–40% reinforcing fibers.

11. The process as recited in claim 9 wherein said thermoplastic polymers are contaminated.

12. The process as recited in claim 11 wherein said contamination is on the order of about 10%.

13. The process as recited in claim 2 wherein said molding step further comprises the step of:

molding a surface texture onto the part.

14. The process as recited in claim 1 wherein said loading step includes the step of:

loading a compatibility enhancing agent into the plasticator.

15. The process as recited in claim 14 wherein said compatibility enhancing agent is an olefinic polymer grafted with polar functional moieties such as acrylic acid or maleic anhydride.

16. The process as recited in claim 1 wherein said process further comprises the step of:

molding the part with a predetermined surface characteristic.

17. The process as recited in claim 16 wherein said predetermined surface characteristic is a preselected pigment.

18. The process as recited in claim 1 wherein said process further comprises the step of:

printing information on the part.

19. The process as recited in claim 2 wherein said process further comprises the step of molding a predetermined feature into the part.

20. The process as recited in claim 19 wherein said predetermined feature is a wood finish.

21. The process as recited in claim 19 wherein the predetermined feature is a reinforcement.

22. The process as recited in claim 1 wherein said process further comprises the step of:

applying a finish to said sheet before said sheet is placed in said mold.

23. The process as recited in claim 22 wherein said process further comprises the step of applying an acrylic finish to said sheet before said sheet is placed in said mold.

24. The process as recited in claim 1 wherein said process further comprises the step of molding a symbol on the part.

25. The process as recited in claim 24 wherein said process further comprises the step of:

molding a part having a graphic image molded into a surface of the part.

26. The process as recited in claim 25 where said part is a basketball backboard.

27. The process as recited in claim 25 where said part is a point-of-purchase display for use in a store.

28. The process as recited in claim 1 wherein said process further comprises the step of:

using a mold having a first mold member having a surface and a complementary mold member which cooperates with said first mold member to mold said part; said surface being textured to facilitate preventing said sheet from slipping in said mold.

29. The process as recited in claim 1 wherein said process further comprises the step of:

blending said billet using a plurality of thermoplastic polymers and a plurality of reinforcing fibers into the plasticator.

30. The process as recited in claim 29 wherein said blending step further comprises the step of:

blending about 60–95% thermoplastic polymers with about 40–5% reinforcing fibers.

31. The process as recited in claim 29 wherein said thermoplastic polymers are contaminated.

32. The process as recited in claim 1 wherein said sheet comprises a graphic.

33. The process as recited in claim 1 wherein said process further comprises the step of:

compression molding said sheet and said billet to produce a part having a graphic image molded into its surface.

34. The process as recited in claim 33 wherein said process further comprises the step of:

using a sheet comprising basketball graphics.

35. The process as recited in claim 33 wherein said process further comprises the step of:

blending said billet using a plurality of thermoplastic polymers and a plurality of reinforcing fibers.

36. The process as recited in claim 35 wherein said blending step further comprises the step of:

blending approximately 60–95% polymers with about 40–5% reinforcing fibers.

37. The process as recited in claim 35 wherein at least one of said thermoplastic polymers are contaminated.

38. The process as recited in claim 35 where said part is a basketball backboard.

39. The process as recited in claim 35 where said part is a point of purchase display.

40. The process as recited in claim 1 wherein said process further comprises the step of:

compression molding said part such that a border is situated around said sheet.

41. The process as recited in claim 40 wherein said process further comprises the step of:

compression molding said part such that said border is co-planar with said sheet after said part is molded.

42. The process as recited in claim 1 wherein said process further comprises the step of cutting said sheet such that it comprises dimensions which generally correspond to the dimensions of said mold.

43. The process as recited in claim 1 where said part is a basketball backboard.

44. The process as recited in claim 1 where said part is a point-of-purchase display.

45. The process of claim 1, wherein the long reinforcing fibers have a length over one-eighth inch.

46. The process of claim 1, wherein the long reinforcing fibers are longer than one-quarter inch.

* * * * *